(12) United States Patent
Nishijima et al.

(10) Patent No.: US 7,460,055 B2
(45) Date of Patent: Dec. 2, 2008

(54) RADAR APPARATUS

(75) Inventors: Masaaki Nishijima, Osaka (JP); Takeshi Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/756,763

(22) Filed: Jun. 1, 2007

(65) Prior Publication Data
US 2007/0285307 A1      Dec. 13, 2007

(30) Foreign Application Priority Data
Jun. 2, 2006    (JP) ............................. 2006-155185

(51) Int. Cl.
*G01S 13/00* (2006.01)
(52) U.S. Cl. ................. 342/70; 342/175; 342/200; 342/203
(58) Field of Classification Search ............ 342/70–72, 342/159–162, 175, 195, 200, 202, 203; 701/301
See application file for complete search history.

(56) References Cited

U.S. PATENT DOCUMENTS

| | | | | |
|---|---|---|---|---|
| 4,078,234 A | * | 3/1978 | Fishbein et al. | 342/110 |
| 4,142,189 A | * | 2/1979 | Gleason | 342/109 |
| 4,401,980 A | * | 8/1983 | Rittenbach et al. | 340/666 |
| 5,731,782 A | * | 3/1998 | Walls | 342/145 |
| 6,313,782 B1 | * | 11/2001 | Lehan et al. | 342/16 |
| 6,801,153 B2 | * | 10/2004 | Rauch et al. | 342/21 |
| 6,861,957 B2 | * | 3/2005 | Koike | 340/903 |
| 7,339,525 B2 | * | 3/2008 | Zimmerman et al. | 342/464 |
| 2007/0109175 A1 | | 5/2007 | Fukuda | |

FOREIGN PATENT DOCUMENTS

| | | |
|---|---|---|
| JP | 2000-009829 | 1/2000 |
| JP | 2001-044880 | 2/2001 |
| JP | 2003-229722 | 8/2003 |

OTHER PUBLICATIONS

English Language Abstract of JP 2003-229722.
English Language Abstract of JP 2000-009829.
English Language Abstract of JP 2001-044880.

* cited by examiner

*Primary Examiner*—Thomas H. Tarcza
*Assistant Examiner*—Peter M Bythrow
(74) *Attorney, Agent, or Firm*—Greenblum & Bernstein, P.L.C.

(57) ABSTRACT

A radar apparatus includes a PN code generator for generating a PN code, a variable delay device for delaying the PN code, an oscillator for generating a high-frequency signal, a transmission frequency multiplier for multiplying a frequency of a transmission differential signal obtained by being divided from the high-frequency signal by 3, a reception frequency multiplier for multiplying a frequency of a reception differential signal obtained by being divided from the high-frequency by 3, a transmitter for generating a radar wave by using the differential signal obtained through the multiplication by the transmission frequency multiplier and the PN code generated by the PN code generator, and a receiver for generating an in-phase signal and a quadrature signal from a reflected wave by using the differential signal obtained through the multiplication by the reception frequency multiplier and the PN code delayed by the delay device.

18 Claims, 25 Drawing Sheets

FIG.15
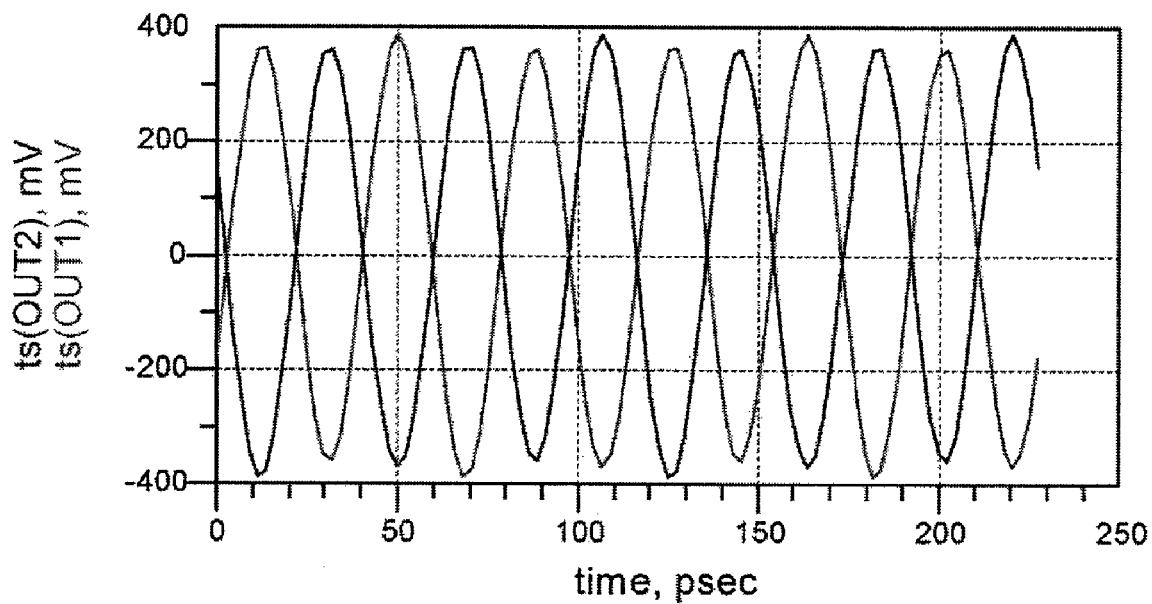
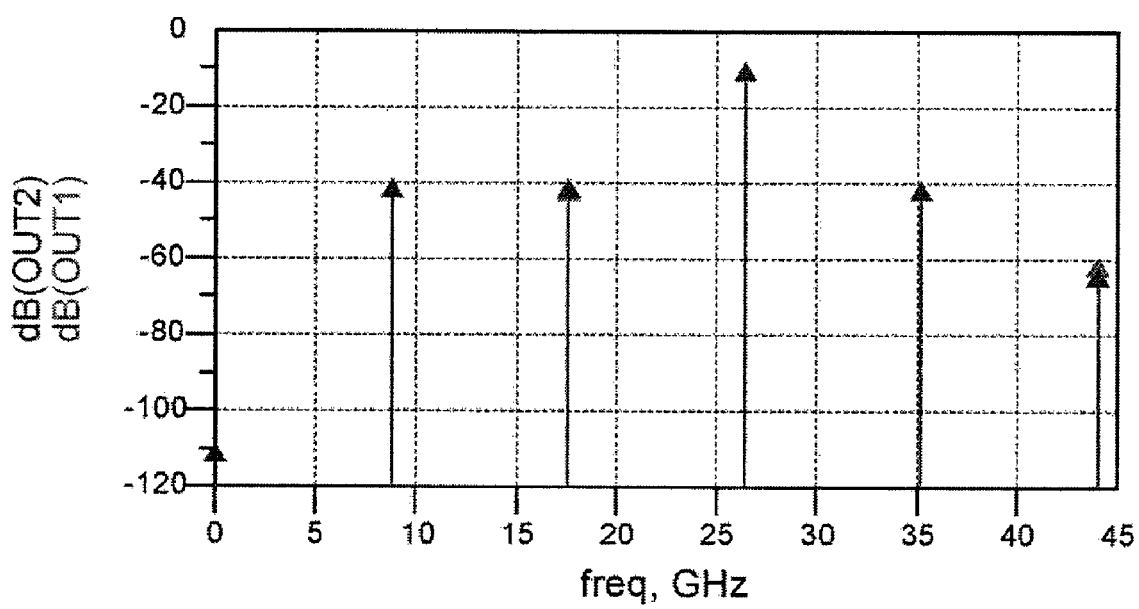

RADAR APPARATUS

BACKGROUND OF THE INVENTION (1) Field of the Invention

The present invention relates to a radar apparatus used at high frequencies such as a microwave band and a millimeter waveband, and in particular, to a radar apparatus which requires higher performance and lower power consumption.

(2) Description of the Related Art

In recent years, an in-vehicle radar apparatus is required to detect an object (hereinafter, referred to as an obstacle) with high accuracy. In particular, in the in-vehicle radar apparatus, higher performance is required of a transmitter for emitting a radio wave to the obstacle and a receiver for receiving and detecting the radio wave reflected from the obstacle, since they use a high-frequency signal.

As for the in-vehicle radar apparatus in particular, a reflected wave from the obstacle has a wide dynamic range from a weak level to a strong level. Therefore, it is important that high-frequency signal isolation is high between the transmitter and the receiver. When the high-frequency signal leaks between the transmitter and the receiver, a noise signal is included in a signal to be transmitted or a signal to be received so that accurate transmission and reception become infeasible. Furthermore, there is a possibility that an unnecessary signal may block obstruct communication and cause interference with the radio wave, which may result in a malfunction.

FIG. 1 is a diagram showing a configuration of a first radar apparatus in a conventional form. As shown in FIG. 1, a radar apparatus 10 is a radar apparatus of a spread spectrum type using a pseudo-noise code (hereinafter, referred to as a PN code).

The high-frequency signal outputted from an oscillator 12 is divided to a balanced modulator 13 and a quadrature demodulator 22a. Here, the high-frequency signal divided to the balanced modulator 13 is a transmission local oscillation signal. The high-frequency signal divided to the quadrature demodulator 22a is a reception local oscillation signal.

The PN codes outputted from a PN code generator 15 are divided to a balanced modulator 14 and a balanced modulator 20 via a variable delay device 21. Here, the PN code divided to the balanced modulator 14 is a transmission PN code. The PN code divided to the balanced modulator 20 via the variable delay device 21 is a reception PN code.

The transmission local oscillation signal and an intermediate-frequency signal outputted from an intermediate-frequency oscillator 11 are mixed by the balanced modulator 13 to be outputted as a modulation signal. The transmission PN code and the modulation signal outputted from the balanced modulator 13 are mixed by the balanced modulator 14 to be outputted as a transmission signal.

The transmission signal outputted from the balanced modulator 14 is transmitted as a radar wave from a transmitting antenna 17 via a transmission signal band pass filter 16. The radar wave transmitted from the transmitting antenna 17 is reflected by the obstacle. The reflected wave which is obtained by being reflected by the obstacle is received as a reception signal by a receiving antenna 18.

The reception signal received by the receiving antenna 18 is amplified by a low noise amplifier 19 and outputted as an amplified signal. The reception PN code and the amplified signal outputted from the low noise amplifier 19 are mixed by the balanced modulator 20 and outputted as a correlated signal. The correlated signal outputted from the balanced modulator 20 is divided to the quadrature demodulator 22a and a quadrature demodulator 22b. Here, the correlated signal divided to the quadrature demodulator 22a is a first correlated signal. The correlated signal divided to the quadrature demodulator 22b is a second correlated signal.

The reception local oscillation signal is divided to the quadrature demodulator 22a and the quadrature demodulator 22b via a 90-degree phase shifter 23. Here, the reception local oscillation signal divided to the quadrature demodulator 22a is a first reception local oscillation signal. The reception local oscillation signal divided to the quadrature demodulator 22b via the 90-degree phase shifter 23 is a second reception local oscillation signal.

The first reception local oscillation signal and the first correlated signal are mixed by the quadrature demodulator 22a and outputted as an I (in-phase) signal. The I (in-phase) signal outputted from the quadrature demodulator 22a is outputted via an intermediate-frequency band pass filter 24a and a logarithmic amplifier 25a.

The second reception local oscillation signal and the second correlated signal are mixed by the quadrature demodulator 22b and outputted as a Q (quadrature) signal. The Q (quadrature) signal outputted from the quadrature demodulator 22b is outputted via an intermediate-frequency band pass filter 24b and a logarithmic amplifier 25b.

The radar apparatus 10 can obtain the reflection intensity by performing signal processing on the I (in-phase) signal outputted from the logarithmic amplifier 25a and the Q (quadrature) signal outputted from the logarithmic amplifier 25b.

Here, double-balanced mixers such as Gilbert cells are used for the balanced modulators 13, 14, 20 and the quadrature demodulators 22a, 22b. Thus, a 26 GHz frequency signal source equivalent to a frequency band of a carrier signal has been conventionally used for the oscillator 12 which is a local signal source of the balanced modulator 13 and the quadrature demodulators 22a, 22b.

FIG. 2 is a diagram showing a configuration of a transmission and reception part of a first radio communication apparatus in a conventional form. As shown in FIG. 2, an oscillator 31 is connected to a transmission frequency conversion unit 33 via a frequency-multiplier-circuit 32. It is further connected to a reception frequency conversion unit 34 via the frequency-multiplier-circuit 32. However, an isolating circuit or an attenuating circuit is not placed in a path which connects the transmission frequency conversion unit 33 to the reception frequency conversion unit 34. The isolating circuit or the attenuating circuit prevents a signal caused by the local oscillation signal from flowing from the transmission frequency conversion unit 33 to the reception frequency conversion unit 34. Similarly, an isolating circuit or an attenuating circuit for preventing a signal caused by the local oscillation signal from flowing from the reception frequency conversion unit 34 to the transmission frequency conversion unit 33 is also not placed. For this reason, a signal caused by the local oscillation signal leaks from a transmitting side to a receiving side (see for example Japanese Unexamined Patent Application Publication No. 2003-229722).

In comparison, FIG. 3 is a diagram showing the configuration of a second radar apparatus in a conventional form. As shown in FIG. 3, an interrupting circuit or an attenuating circuit is placed in a path connecting an up converter 42 to a down converter 43 so that a signal caused by the local oscillation signal outputted from an oscillator 41 is not leaked from the transmitting side to the receiving side. To be more specific, an isolator 44 as the interrupting circuit and an attenuator 45 as the attenuating circuit are placed (see for example Japanese Unexamined Patent Application Publication No. 2000-9829).

FIG. 4 is a diagram showing a configuration of a transmission and reception part of a second radio communication device in the conventional form. As shown in FIG. 4, in a transmitter-receiver used for the radio communication device and the like, a signal outputted from an oscillator 51 is inputted to a mixer 53 via a multiplier 52a of a multiplication rate of A times. It is inputted to a modulator 54 via a multiplier 52b of a multiplication rate of B times (see for example Japanese Unexamined Patent Application Publication No. 2001-44880). However, higher-frequency characteristics such as gain characteristics of the multipliers cannot be guaranteed just by diverting the multipliers 52a and 52b used in the radio communication device to the radar apparatus which uses a higher-frequency signal than the signal used by the radio communication device. Therefore, a scheme which conforms with the radar apparatus is required.

In the case of the first conventional radar apparatus, however, a high-frequency signal equivalent to the frequency band of a carrier wave (such as 26 GHz) is outputted as-is from the oscillator 12 which is the signal source of the local oscillation signal of the balanced modulator 13 and the quadrature demodulators 22a, 22b.

In this case, it is not possible to secure sufficient isolation from the high-frequency signal outputted from the oscillator 12 in the path connecting the balanced modulator 13 to the quadrature demodulator 22a. For this reason, a signal caused by the high-frequency signal outputted from the oscillator 12 leaks from the balanced modulator 13 to the quadrature demodulator 22a. As a result, there is a problem that wrong detection occurs due to the leaked signal, and the accurate distance and location of the obstacle cannot be identified from the reflected wave obtained through the reflection of the radar wave from the obstacle.

As for the second conventional radar apparatus, the isolator 44 and attenuating circuit 45 are placed in the path connecting the up converter 42 to the down converter 43 so that a signal caused by the local oscillation signal outputted from the oscillator 41 is not leaked from the transmitting side to the receiving side. In this configuration, it is necessary, for the sake of realizing an input level required for the availability of the up converter 42, to consider losses caused by the isolator 44 and attenuating circuit 45 as against the local oscillation signal outputted from the oscillator 41. Similarly, it is necessary, for the sake of realizing an input level required for the availability of the down converter 43, to consider the losses caused by the isolator 44 and attenuating circuit 45 as against the local oscillation signal outputted from the oscillator 41. For this reason, it is necessary to output the local oscillation signal from the oscillator 41 with its output level rather high. Thus, there are problems that operating currents increase, power supply voltage needs to be increased, and power consumption becomes high.

SUMMARY OF THE INVENTION

The present invention is conceived in view of the aforementioned problems, and an object thereof is to provide a radar apparatus which can realize high isolation and low power consumption even when used at high frequencies such as a microwave band and a millimeter waveband.

In order to achieve the aforementioned object, the radar apparatus according to the present invention has the following characteristics.

(a) A radar apparatus which transmits a spectrum-spread radar wave, receives a reflected wave obtained through reflection of the radar wave off an object, and detects the object from the reflected wave, the radar apparatus including: (a1) a pseudo-noise code generator which generates a pseudo-noise code; (a2) a delay device which delays the pseudo-noise code generated by the pseudo-noise code generator; (a3) an oscillator which generates a high-frequency signal; (a4) a transmission multiplier, made up of a differential circuit for inputting and outputting a differential signal, to which a high-frequency signal divided for transmission from the high-frequency signal generated by the oscillator is inputted as a transmission differential signal which is the differential signal, and which multiplies a frequency of the transmission differential signal by a predetermined multiplication ratio, the differential signal being made up of a positive-side signal and a negative-side signal; (a5) a reception multiplier, made up of the differential circuit, to which a high-frequency signal divided for reception from the high-frequency signal generated by the oscillator is inputted as a reception differential signal which is the differential signal, and which multiplies a frequency of the reception differential signal by the same multiplication ratio as with the transmission multiplier; (a6) a transmitter which generates the radar wave by using the differential signal obtained through the multiplication by the transmission multiplier and the pseudo-noise code generated by the pseudo-noise code generator; and (a7) a receiver which generates, from the reflected wave, a first demodulated signal and a second demodulated signal by using the differential signal obtained through the multiplication by the reception multiplier and the pseudo-noise code delayed by the delay device, the second demodulated signal having a phase that is orthogonal to the first demodulated signal.

Thus, it is possible to secure isolation of the high-frequency signal in a path connecting a transmitter and a receiver. It is possible to suppress the leakage of a reflected signal caused by the high-frequency signal, from the transmitter to the receiver. Similarly, it is possible to suppress the leakage from the receiver to the transmitter. Furthermore, it is possible to set an output level of an oscillator lower than the case of not using a transmission multiplier or a reception multiplier so as to allow low power consumption.

Furthermore, it is also possible that (b) (b1) the transmitter includes a first mixer which mixes the differential signal obtained through the multiplication by the transmission multiplier and the pseudo-noise code generated by the pseudo-noise code generator, so as to generate a signal to be transmitted as the radar wave, (b2) the receiver includes: (b2-1) an offset clock which generates an intermediate-frequency clock signal; (b2-2) an exclusive-OR calculating unit which calculates an exclusive-OR between the pseudo-noise code delayed by the delay device and the intermediate-frequency clock signal generated by the offset clock; (b2-3) a second mixer which mixes the signal obtained through the calculation of the exclusive-OR by the exclusive-OR calculating unit and the reflected wave, so as to inversely spread the reflected wave of which spectrum is spread; (b2-4) a third mixer which mixes the signal obtained through the mixing by the second mixer and the differential signal obtained through the multiplication by the reception multiplier, so as to generate the first demodulated signal of an intermediate frequency; (b2-5) a phase shifter which shifts, by 90 degrees, a phase of the differential signal obtained through the multiplication by the reception multiplier; and (b2-6) a fourth mixer which mixes the signal obtained through the mixing by the second mixer and the differential signal obtained through the phase shifting by the phase shifter, so as to generate the second demodulated signal of an intermediate frequency.

Thus, it is possible to secure isolation of the high-frequency signal in the path connecting the first mixer of the transmitter and the third mixer of the receiver. It is possible to suppress the leakage of a reflected signal caused by the high-frequency signal, from the first mixer of the transmitter to the third mixer of the receiver. Similarly, it is possible to prevent the leakage from the third mixer of the receiver to the first mixer of the transmitter.

Alternatively, it is also possible that (c) (c1) the transmitter includes: (c1-1) an intermediate-frequency oscillator which generates an intermediate-frequency signal; (c1-2) a first mixer which mixes the intermediate-frequency signal generated by the intermediate-frequency oscillator and the differential signal obtained through the multiplication by the transmission multiplier; and (c1-3) a second mixer which mixes the signal obtained through the mixing by the first mixer and the pseudo-noise code generated by the pseudo-noise code generator, so as to generate a signal to be transmitted as the radar wave, and (c2) the receiver includes: (c2-1) a third mixer which mixes the pseudo-noise code delayed by the delay device and the reflected wave, so as to inversely spread the reflected wave of which spectrum is spread; (c2-2) a fourth mixer which mixes the signal obtained through the mixing by the third mixer and the differential signal obtained through the multiplication by the reception multiplier, so as to generate the first demodulated signal of an intermediate frequency; (c2-3) a phase shifter which shifts, by 90 degrees, a phase of the differential signal obtained through the multiplication by the reception multiplier; and (c2-4) a fifth mixer which mixes the signal obtained through the mixing by the third mixer and the differential signal obtained through the phase shifting by the phase shifter, so as to generate the second demodulated signal of an intermediate frequency.

Thus, it is possible to secure isolation of the high-frequency signal in the path connecting the first mixer of the transmitter and the fourth mixer of the receiver. It is possible to prevent the leakage of a reflected signal caused by the high-frequency signal, from the first mixer of the transmitter to the fourth mixer of the receiver. Similarly, it is possible to prevent the leakage from the fourth mixer of the receiver to the first mixer of the transmitter.

Alternatively, it is also possible that (d) (d1) the transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (d2) a virtual ground of the first amplifier circuit and a virtual ground of the second amplifier circuit are electrically connected, via a via hole, with a ground layer formed on a backside of a semiconductor substrate on which the differential amplifier circuit is formed.

Thus, in the case where the transmission multiplier is made up of a multistage differential amplifier circuit, the high-frequency signal is transmitted in the transmission multiplier, and so it is possible to suppress the generation of a difference caused by a reference grounding impedance of the differential amplifier circuit of each individual stage. Furthermore, as a good grounding state can be realized, it is possible to suppress the deterioration of gain characteristics of the transmission multiplier.

Alternatively, it is also possible that (e) (e1) the transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (e2) a virtual ground of the first amplifier circuit and a virtual ground of the second amplifier circuit are electrically connected, via a via hole, with a ground layer formed in a layer portion lower than a portion in which the differential amplifier circuit is formed, in a semiconductor substrate on which the differential amplifier circuit is formed.

Thus, in the case where the transmission multiplier is made up of a multistage differential amplifier circuit, the high-frequency signal is transmitted in the transmission multiplier, and so it is possible to suppress the generation of a difference caused by a reference grounding impedance of the differential amplifier circuit of each individual stage. Furthermore, as a good grounding state can be realized, it is possible to prevent deterioration of gain characteristics of the transmission multiplier.

Alternatively, it is also possible that (f) (f1) the transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (f2) a virtual ground of the first amplifier circuit and a virtual ground of the second amplifier circuit are electrically connected, via a via hole, with a ground layer formed in a layer portion higher than a portion in which the differential amplifier circuit is formed, in a semiconductor substrate on which the differential amplifier circuit is formed.

Thus, in the case where the transmission multiplier is made up of a multistage differential amplifier circuit, the high-frequency signal is transmitted in the transmission multiplier, and so it is possible to suppress the generation of a difference caused by a reference grounding impedance of the differential amplifier circuit of each individual stage. Furthermore, as a good grounding state can be realized, it is possible to suppress the deterioration of gain characteristics of the transmission multiplier.

Alternatively, it is also possible that (g) the transmission multiplier includes: (g1) an input buffer circuit which generates, from the transmission differential signal, a first differential signal and a second differential signal having a phase difference of 90 degrees from the first differential signal; (g2) a Gilbert cell mixer which mixes the first differential signal and the second differential signal generated by the input buffer circuit; and (g3) an output buffer circuit which amplifies a third differential signal obtained through the mixing by the Gilbert cell mixer.

Furthermore, it is also possible that (h) (h1) the input buffer circuit is made up of one or more transistors, and generates the first differential signal and the second differential signal, (h2) the Gilbert cell mixer is made up of one or more transistors, and generates the third differential signal from the first differential signal and the second differential signal, and (h3) the transmission multiplier includes: (h3-1) a first bias terminal to which a signal for adjusting a bias of one or more transistors is inputted, the one or more transistors making up the input buffer circuit and being inputted with the positive-side signal of the transmission differential signal; and (h3-2) a second bias terminal to which a signal for adjusting a bias of one or more transistors is inputted, the one or more transistors making up the input buffer circuit and being inputted with the negative-side signal of the transmission differential signal.

Thus, by providing the first bias terminal and the second bias terminal, it is possible to adjust the bias of one or more transistors of the input buffer circuit and set the isolation to a maximum.

Alternatively, it is also possible that (i) (i1) the input buffer circuit is made up of a polyphase filter, and generates the first differential signal and the second differential signal, (12) the Gilbert cell mixer is made up of one or more transistors, and generates a third differential signal from the first differential signal and the second differential signal, and (i3) the transmission multiplier includes: (i3-1) a first bias terminal to which a signal for adjusting a bias of one or more transistors is inputted, the one or more transistors making up the Gilbert cell mixer and being inputted with the positive-side signal of the first differential signal; (i3-2) a second bias terminal to which a signal for adjusting a bias of one or more transistors is inputted, the one or more transistors making up the Gilbert cell mixer and being inputted with the negative-side signal of the first differential signal; (i3-3) a third bias terminal to which a signal for adjusting a bias of one or more transistors is inputted, the one or more transistors making up the Gilbert cell mixer and being inputted with the positive-side signal of the second differential signal; and (i3-4) a fourth bias terminal to which a signal for adjusting a bias of one or more transistors is inputted, the one or more transistors making up the Gilbert cell mixer and being inputted with the negative-side signal of the second differential signal.

Thus, by providing the first bias terminal and the second bias terminal and providing the third bias terminal and the fourth bias terminal, it becomes possible to adjust the bias of one or more transistors of the Gilbert cell mixer and set the isolation to a maximum.

Alternatively, it is also possible that (j) the high-frequency signal generated by the oscillator is a single-ended signal, and the radar apparatus includes a conversion circuit which converts the single-ended signal generated by the oscillator into the differential signal, and outputs the differential signal to the transmission multiplier and the reception multiplier.

Thus, it is possible to use an oscillator which uses a single-ended signal.

Alternatively, it is also possible that the (k) radar apparatus includes a transmission amplifier which amplifies the differential signal obtained through the multiplication by the transmission multiplier, and outputs the amplified differential signal to the transmitter.

Thus, it is possible to adjust the output level of the transmission multiplier and also suppress the leakage from the transmitter by a reverse gain of the transmission amplifier.

Alternatively, it is also possible that (l) (l1) the reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (l2) a virtual ground of the first amplifier circuit and a virtual ground of the second amplifier circuit are electrically connected, via a via hole, with a ground layer formed on a backside of a semiconductor substrate on which the differential amplifier circuit is formed.

Thus, in the case where the reception multiplier is made up of a multistage differential amplifier circuit, the high-frequency signal is transmitted in the reception multiplier, and so it is possible to suppress the generation of a difference caused by a reference grounding impedance of the differential amplifier circuit of each individual stage. Furthermore, as a good grounding state can be realized, it is possible to suppress the deterioration of gain characteristics of the reception multiplier.

Alternatively, it is also possible that (m) (m1) the reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (m2) a virtual ground of the first amplifier circuit and a virtual ground of the second amplifier circuit are electrically connected, via a via hole, with a ground layer formed in a layer portion lower than a portion in which the differential amplifier circuit is formed, in a semiconductor substrate on which the differential amplifier circuit is formed.

Thus, in the case where the reception multiplier is made up of a multistage differential amplifier circuit, the high-frequency signal is transmitted in the reception multiplier, and so it is possible to suppress the generation of a difference caused by a reference grounding impedance of the differential amplifier circuit of each individual stage. Furthermore, as a good grounding state can be realized, it is possible to suppress the deterioration of gain characteristics of the reception multiplier.

Alternatively, it is also possible that (n) (n1) the reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (n2) a virtual ground of the first amplifier circuit and a virtual ground of the second amplifier circuit are electrically connected, via a via hole, with a ground layer formed in a layer portion higher than a portion in which the differential amplifier circuit is formed, in a semiconductor substrate on which the differential amplifier circuit is formed.

Thus, in the case where the reception multiplier is made up of a multistage differential amplifier circuit, the high-frequency signal is transmitted in the reception multiplier, and so it is possible to suppress the generation of a difference caused by a reference grounding impedance of the differential amplifier circuit of each individual stage. Furthermore, as a good grounding state can be realized, it is possible to suppress the deterioration of gain characteristics of the reception multiplier.

Alternatively, it is also possible that (o) the reception multiplier includes: (o1) an input buffer circuit which generates, from the reception differential signal, a first differential signal and a second differential signal having a phase difference of 90 degrees from the first differential signal; (o2) a Gilbert cell mixer which mixes the first differential signal and the second differential signal generated by the input buffer circuit; and (o3) an output buffer circuit which amplifies a third differential signal obtained through the mixing by the Gilbert cell mixer.

Furthermore, it is also possible that (p) (p1) the input buffer circuit is made up of one or more transistors, and generates the first differential signal and the second differential signal, (p2) the Gilbert cell mixer is made up of one or more transistors, and generates the third differential signal from the first differential signal and the second differential signal, and (p3) the reception multiplier includes: (p3-1) a first bias terminal to which a signal for adjusting a bias of one or more transistors is inputted, the one or more transistors making up the input buffer circuit and being inputted with the positive-side signal of the reception differential signal; and (p3-2) a second bias terminal to which a signal for adjusting a bias of one or more transistors is inputted, the one or more transistors making up the input buffer circuit and being inputted with the negative-side signal of the reception differential signal.

Thus, by providing the first bias terminal and the second bias terminal, it is possible to adjust the bias of one or more transistors of the input buffer circuit and set the isolation to a maximum.

Alternatively, it is also possible that (q) (q1) the input buffer circuit is made up of a polyphase filter, and generates the first differential signal and the second differential signal, (q2) the Gilbert cell mixer is made up of one or more transistors, and generates the third differential signal from the first differential signal and the second differential signal, and (q3) the reception multiplier includes: (q3-1) a first bias terminal to which a signal for adjusting a bias of one or more transistors is inputted, the one or more transistors making up the Gilbert cell mixer and being inputted with the positive-side signal of the first differential signal; (q3-2) a second bias terminal to which a signal for adjusting a bias of one or more transistors is inputted, the one or more transistors making up the Gilbert cell mixer and being inputted with the negative-side signal of the first differential signal; (q3-3) a third bias terminal to which a signal for adjusting a bias of one or more transistors is inputted, the one or more transistors making up the Gilbert cell mixer and being inputted with the positive-side signal of the second differential signal; and (q3-4) a fourth bias terminal to which a signal for adjusting a bias of one or more transistors is inputted, the one or more transistors making up the Gilbert cell mixer and being inputted with the negative-side signal of the second differential signal.

Thus, by providing the first bias terminal and the second bias terminal and providing the third bias terminal and the fourth bias terminal, it is possible to adjust the bias of one or more transistors of the Gilbert cell mixer and set the isolation to a maximum.

Alternatively, it is also possible that (r) the radar apparatus includes a reception amplifier which amplifies the differential signal obtained through the multiplication by the reception multiplier, and outputs the amplified differential signal to the receiver.

Thus, it is possible to adjust the output level of the reception multiplier and also suppress the leakage from the receiver by a reverse gain of the reception amplifier.

As above, according to the present invention, by providing a frequency multiplier, it is possible to secure isolation of the high-frequency signal outputted from the oscillator, in the path connecting the transmitter and the receiver. It is possible to suppress the leakage of a reflected signal caused by the high-frequency signal outputted from the oscillator, from the transmitter to the receiver. Similarly, it is possible to suppress the leakage from the receiver to the transmitter.

It is thereby possible, as a receiving detection specification, to avoid deterioration of an S/N (Signal-to-Noise) ratio which is an index indicating receiver (detection) sensitivity, caused by the leakage of a 26 GHz-band signal on the receiver side.

Furthermore, it is possible to set the output level of the oscillator lower than the case of not using the frequency multiplier so as to allow low power consumption.

Furthermore, the input buffer circuit of the frequency multiplier may be made up of one or more transistors. In this case, by providing the first bias terminal and the second bias terminal, it is possible to adjust the bias of one or more transistors of the input buffer circuit and set the isolation to a maximum.

Furthermore, the input buffer circuit of the frequency multiplier may be made up of a polyphase filter. In this case, by providing the first bias terminal and the second bias terminal and providing the third bias terminal and the fourth bias terminal, it is possible to adjust the bias of one or more transistors of the Gilbert cell mixer and set the isolation to a maximum.

Furthermore, in the case where the frequency multiplier is made up of a multistage differential amplifier circuit, the 26 GHz-band high-frequency signal which is almost a millimeter waveband is transmitted in the frequency multiplier, and so it is possible to suppress the generation of a difference caused by a reference grounding impedance of the differential amplifier circuit of each individual stage. Furthermore, as a good grounding state can be realized, it is possible to suppress deterioration of gain characteristics of the frequency multiplier.

As a result, it is possible to receive a reflected wave obtained by having the transmitted radar wave reflected by an obstacle, and correctly perform detection for identifying the obstacle from the received reflected wave.

FURTHER INFORMATION ABOUT TECHNICAL BACKGROUND TO THIS APPLICATION

The disclosure of Japanese Patent Application No. 2006-155185 filed on Jun. 2, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 15 is a diagram showing voltage waveforms of the differential signal outputted from the frequency multiplier of the second embodiment according to the present invention;

DESCRIPTION OF THE PREFERRED EMBODIMENTS

First Embodiment

Figure 1:
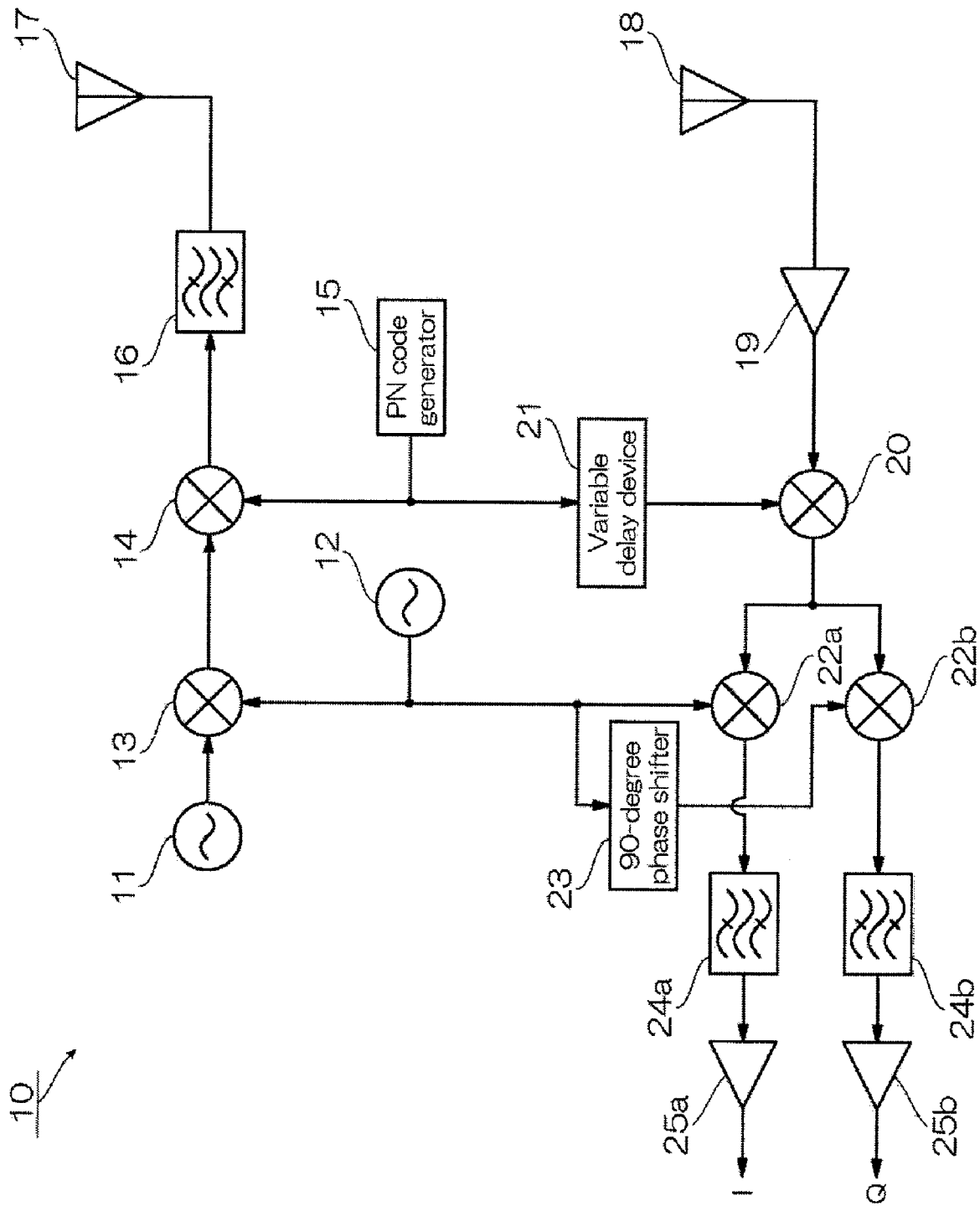
FIG. 1 is a diagram showing a configuration of a first radar apparatus in a conventional form.
Figure 2:
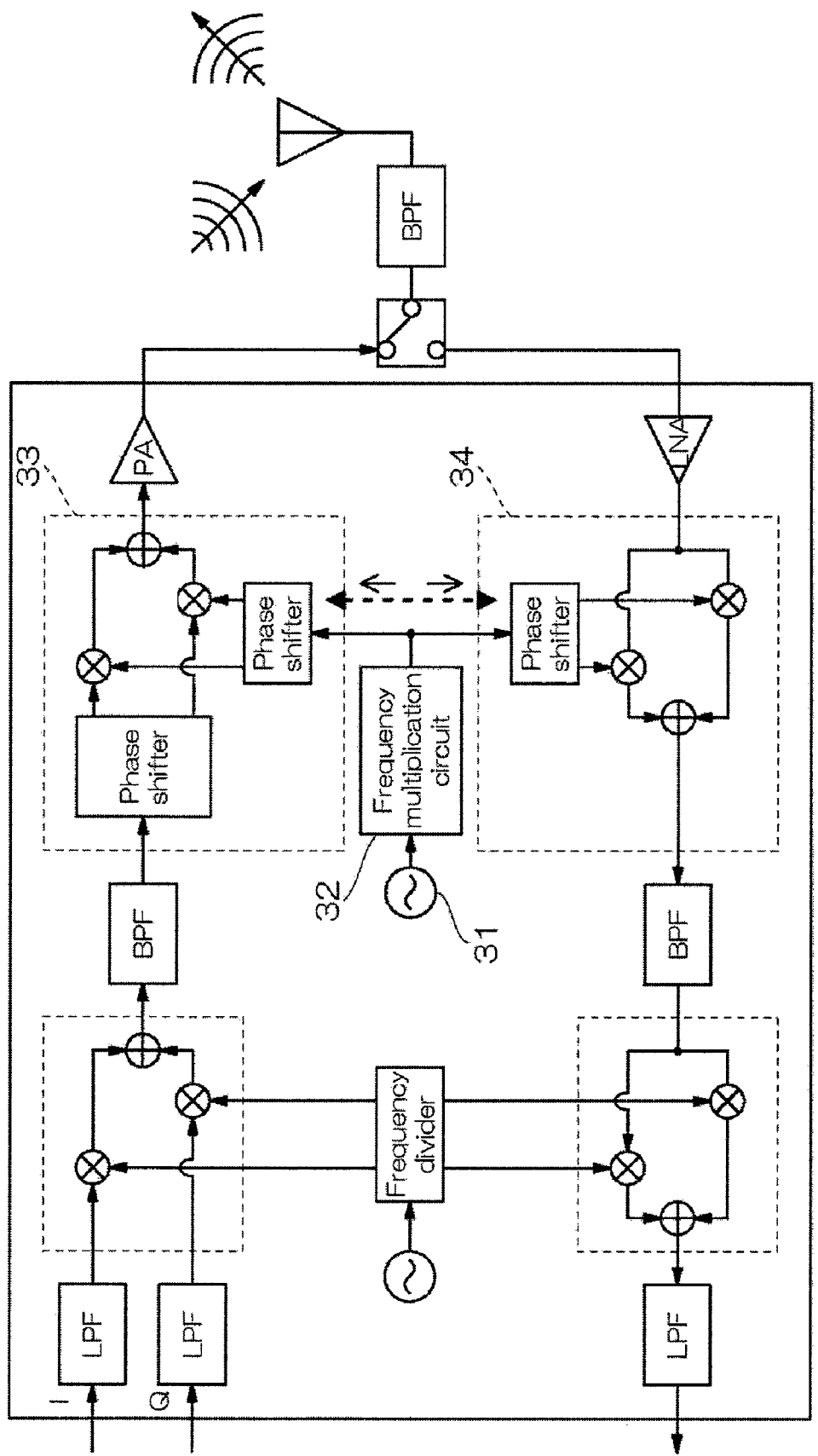
FIG. 2 is a diagram showing the configuration of a transmission and reception part of a first radio communication device in the conventional form.
Figure 3:
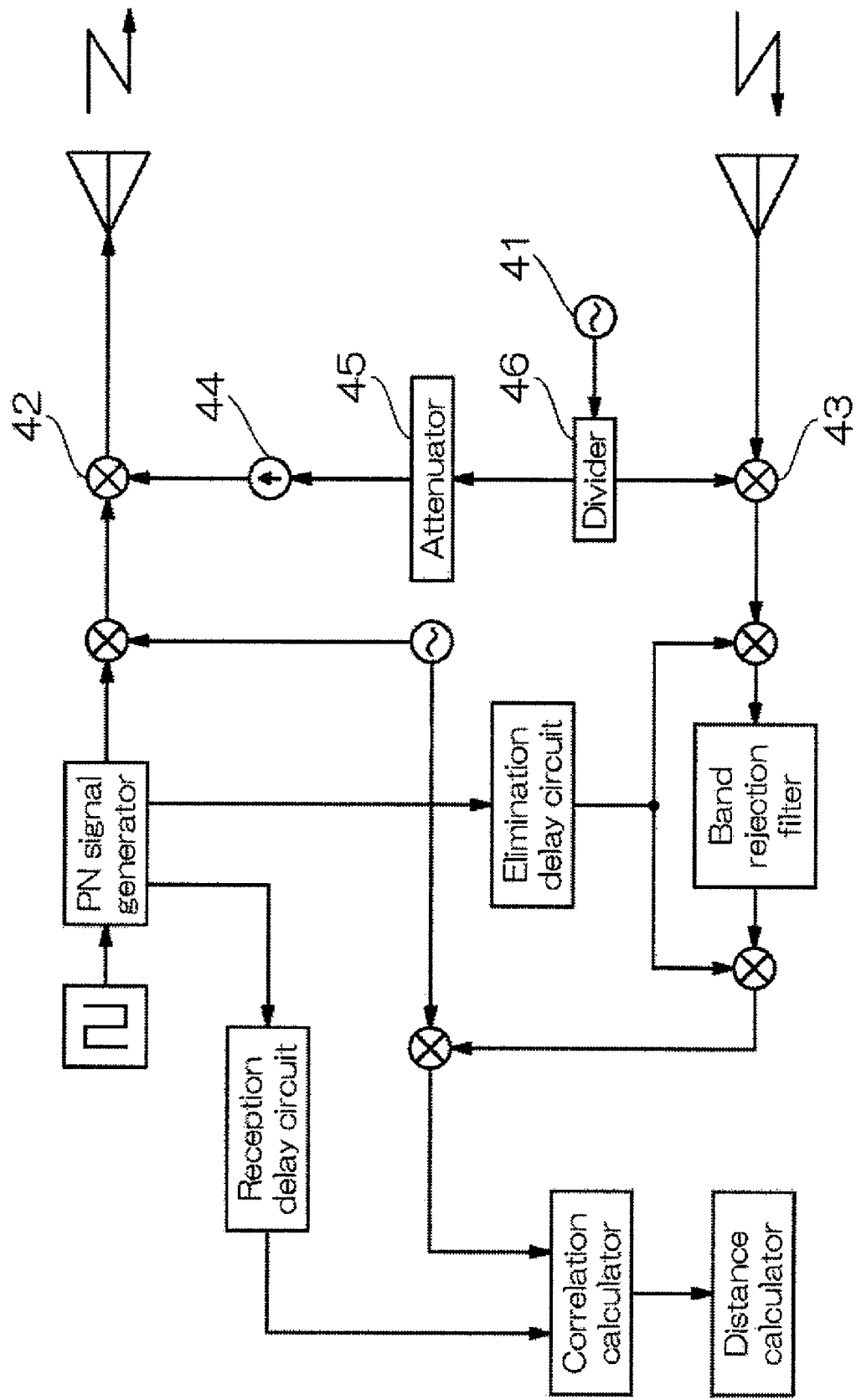
FIG. 3 is a diagram showing the configuration of a second radar apparatus in the conventional form.
Figure 4:
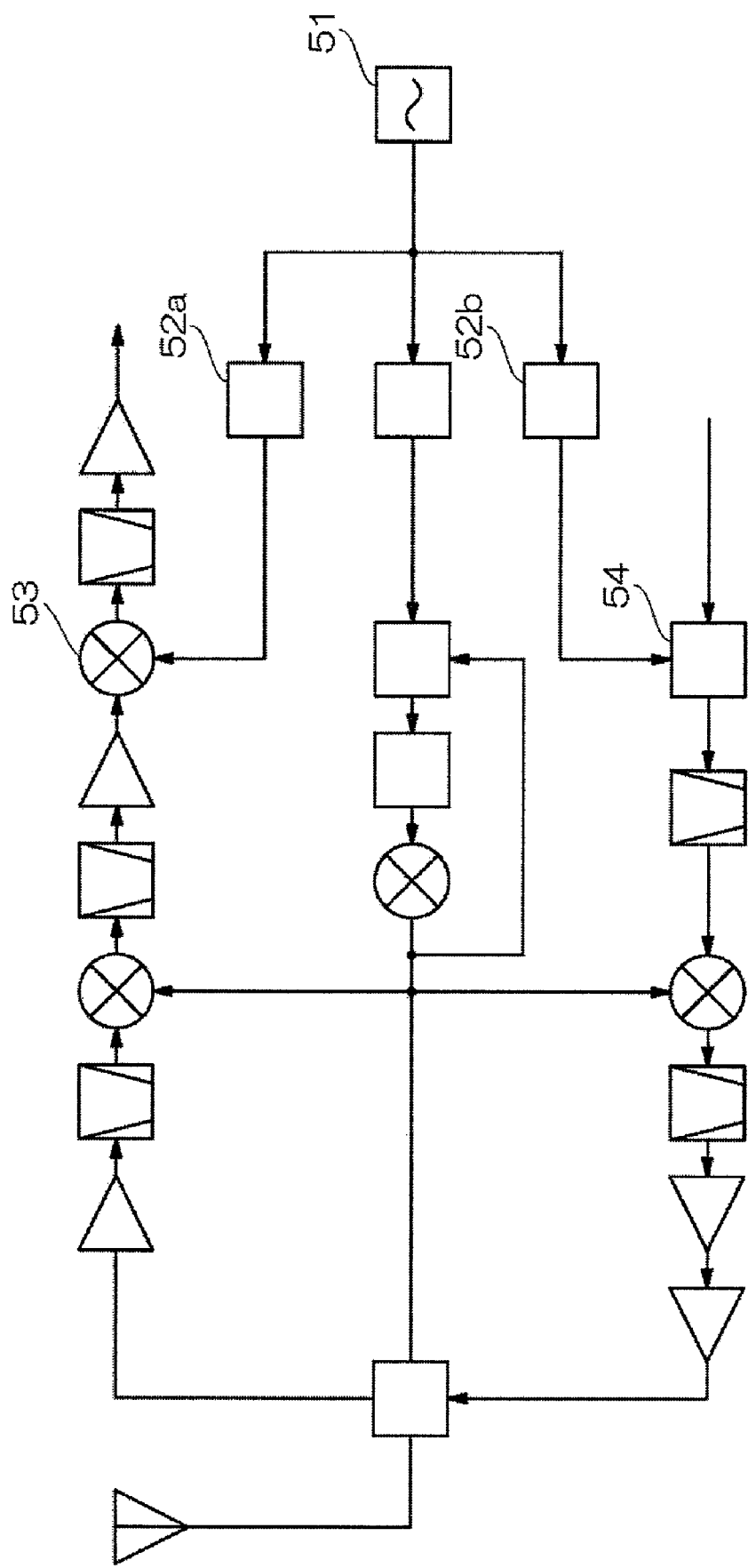
FIG. 4 is a diagram showing the configuration of the transmission and reception part of the second radio communication device in the conventional form.

Hereafter, a first embodiment according to the present invention will be described with reference to the drawings.

The radar apparatus according to the present embodiment has characteristics indicated by the following (a) to (f).

(a) It is a radar apparatus which transmits a spectrum-spread radar wave, receives a reflected wave obtained through reflection of the radar wave off an object, and detects the object from the reflected wave, the radar apparatus including: (a1) a pseudo-noise code generator which generates a pseudo-noise code; (a2) a delay device which delays the pseudo-noise code generated by the pseudo-noise code generator; (a3) an oscillator which generates a high-frequency signal; (a4) a transmission multiplier, made up of a differential circuit for inputting and outputting a differential signal, to which a high-frequency signal divided for transmission from the high-frequency signal generated by the oscillator is inputted as a transmission differential signal which is the differential signal, and which multiplies a frequency of the transmission differential signal by a predetermined multiplication ratio, the differential signal being made up of a positive-side signal and a negative-side signal; (a5) a reception multiplier, made up of the differential circuit, to which a high-frequency signal divided for reception from the high-frequency signal generated by the oscillator is inputted as a reception differential signal which is the differential signal, and which multiplies a frequency of the reception differential signal by the same multiplication ratio as with the transmission multiplier; (a6) a transmitter which generates the radar wave by using the differential signal obtained through the multiplication by the transmission multiplier and the pseudo-noise code generated by the pseudo-noise code generator; and (a7) a receiver which generates, from the reflected wave, a first demodulated signal and a second demodulated signal by using the differential signal obtained through the multiplication by the reception multiplier and the pseudo-noise code delayed by the delay device, the second demodulated signal having a phase that is orthogonal to the first demodulated signal.

(b) (b1) the transmitter includes: (b1-1) an intermediate-frequency oscillator which generates an intermediate-frequency signal; (b1-2) a first mixer which mixes the intermediate-frequency signal generated by the intermediate-frequency oscillator and the differential signal obtained through the multiplication by the transmission multiplier; and (b1-3) a second mixer which mixes the signal obtained through the mixing by the first mixer and the pseudo-noise code generated by the pseudo-noise code generator, so as to generate a signal to be transmitted as the radar wave, and (b2) the receiver includes: (b2-1) a third mixer which mixes the pseudo-noise code delayed by the delay device and the reflected wave, so as to inversely spread the reflected wave of which spectrum is spread; (b2-2) a fourth mixer which mixes the signal obtained through the mixing by the third mixer and the differential signal obtained through the multiplication by the reception multiplier, so as to generate the first demodulated signal of an intermediate frequency; (b2-3) a phase shifter which shifts, by 90 degrees, a phase of the differential signal obtained through the multiplication by the reception multiplier; and (b2-4) a fifth mixer which mixes the signal obtained through the mixing by the third mixer and the differential signal obtained through the phase shifting by the phase shifter, so as to generate the second demodulated signal of an intermediate frequency.

(c) the transmission multiplier includes: (c1) an input buffer circuit which generates, from the transmission differential signal, a first differential signal and a second differential signal having a phase difference of 90 degrees from the first differential signal; (c2) a Gilbert cell mixer which mixes the first differential signal and the second differential signal generated by the input buffer circuit; and (c3) an output buffer circuit which amplifies a third differential signal obtained through the mixing by the Gilbert cell mixer.

(d) (d1) the input buffer circuit is made up of one or more transistors, and generates the first differential signal and the second differential signal, (d2) the Gilbert cell mixer is made up of one or more transistors, and generates the third differential signal from the first differential signal and the second differential signal, and (d3) the transmission multiplier includes: (d3-1) a first bias terminal to which a signal for adjusting a bias of one or more transistors is inputted, the one or more transistors making up the input buffer circuit and being inputted with the positive-side signal of the transmission differential signal; and (d3-2) a second bias terminal to which a signal for adjusting a bias of one or more transistors is inputted, the one or more transistors making up the input buffer circuit and being inputted with the negative-side signal of the transmission differential signal.

(e) the reception multiplier includes: (e1) an input buffer circuit which generates, from the reception differential signal, a first differential signal and a second differential signal having a phase difference of 90 degrees from the first differential signal; (e2) a Gilbert cell mixer which mixes the first differential signal and the second differential signal generated by the input buffer circuit; and (e3) an output buffer circuit which amplifies a third differential signal obtained through the mixing by the Gilbert cell mixer.

(f) (f1) The input buffer circuit is made up of one or more transistors, and generates the first differential signal and the second differential signal, (f2) the reception multiplier includes: (f2-1) a first bias terminal to which a signal for adjusting a bias of one or more transistors is inputted, the one or more transistors making up the input buffer circuit and being inputted with the positive-side signal of the reception differential signal; and (f2-2) a second bias terminal to which a signal for adjusting a bias of one or more transistors is inputted, the one or more transistors making up the input buffer circuit and being inputted with the negative-side signal of the reception differential signal.

Note that the radar apparatus according to the present embodiment may also have one of the characteristics indicated by the following (g) to (i).

(g) the high-frequency signal generated by the oscillator is a single-ended signal, and the radar apparatus includes a conversion circuit which converts the single-ended signal generated by the oscillator into the differential signal, and outputs the differential signal to the transmission multiplier and the reception multiplier.

(h) The radar apparatus includes a transmission amplifier which amplifies the differential signal obtained through the multiplication by the transmission multiplier, and outputs the amplified differential signal to the transmitter.

(i) The radar apparatus includes a reception amplifier which amplifies the differential signal obtained through the multiplication by the reception multiplier, and outputs the amplified differential signal to the receiver.

Note that the radar apparatus according to the present embodiment may also have the characteristics indicated by the following (j), instead of the above (d).

(j) (j-1) The input buffer circuit is made up of a polyphase filter, and generates a first differential signal and a second differential signal, (j2) the Gilbert cell mixer is made up of one or more transistors, and generates a third differential signal from the first differential signal and the second differential signal, and (j3) the transmission multiplier includes: (j3-1) a first bias terminal to which a signal for adjusting a bias of one or more transistors is inputted, the one or more transistors making up the Gilbert cell mixer and being inputted with the positive-side signal of the first differential signal, (j3-2) a second bias terminal to which a signal for adjusting a bias of one or more transistors is inputted, the one or more transistors making up the Gilbert cell mixer and being inputted with the negative-side signal of the first differential signal, (j3-3) a third bias terminal to which a signal for adjusting a bias of one or more transistors is inputted, the one or more transistors making up the Gilbert cell mixer and being inputted with the positive-side signal of the second differential signal, and (j3-4) a fourth bias terminal to which a signal for adjusting a bias of one or more transistors is inputted, the one or more transistors making up the Gilbert cell mixer and being inputted with the negative-side signal of the second differential signal.

Note that the radar apparatus according to the present embodiment may also have the characteristics indicated by the following (k), instead of the above (f).

(k) (k1) The input buffer circuit is made up of a polyphase filter, and generates a first differential signal and a second differential signal, and (k2) the reception multiplier includes: (k2-1) a first bias terminal to which a signal for adjusting a bias of one or more transistors is inputted, the one or more transistors making up the Gilbert cell mixer and being inputted with the positive-side signal of the first differential signal, (k2-2) a second bias terminal to which a signal for adjusting a bias of one or more transistors is inputted, the one or more transistors making up the Gilbert cell mixer and being inputted with the negative-side signal of the first differential signal, (k2-3) a third bias terminal to which a signal for adjusting a bias of one or more transistors is inputted, the one or more transistors making up the Gilbert cell mixer and being inputted with the positive-side signal of the second differential signal, and (k2-4) a fourth bias terminal to which a signal for adjusting a bias of one or more transistors is inputted, the one or more transistors making up the Gilbert cell mixer and being inputted with the negative-side signal of the second differential signal.

The radar apparatus according to the present embodiment will be described based on the above points.

First, a configuration of the radar apparatus according to the present embodiment will be described.

Figure 5:
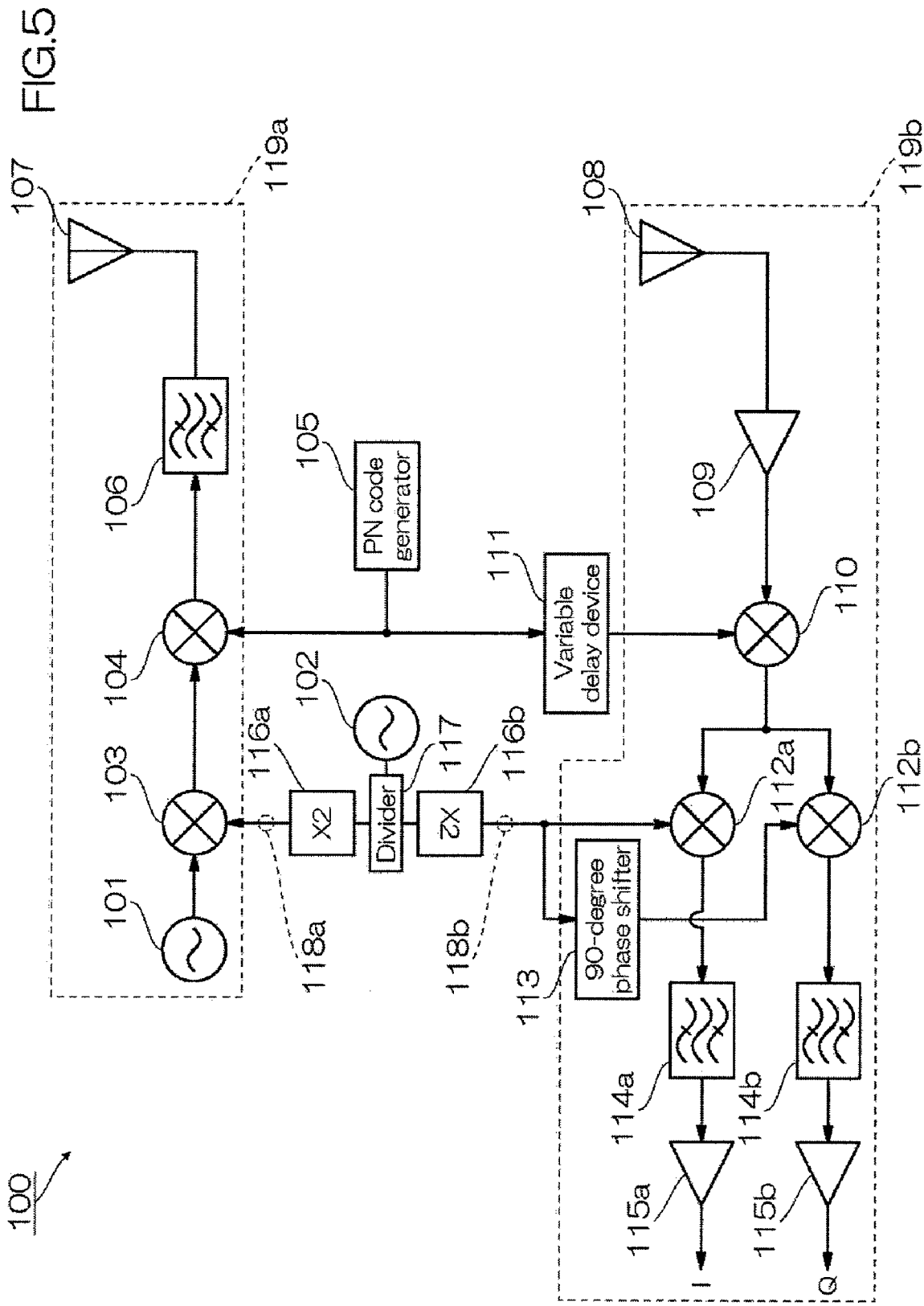
FIG. 5 is a diagram showing the configuration of the radar apparatus of a first embodiment according to the present invention.

FIG. 5 is a diagram showing the configuration of the radar apparatus of the present embodiment. As shown in FIG. 5, a radar apparatus 100 is the radar apparatus of a spread spectrum type using a pseudo-noise code (hereinafter, referred to as a PN code).

To be more precise, the radar apparatus 100 spread-modulates a narrowband signal to a broadband signal by using a transmission PN code. It transmits, as the radar wave, the broadband signal obtained by performing spread modulation. It receives, as a reception signal, the reflected wave obtained by reflecting the transmitted radar waves off an object (hereinafter, referred to as an obstacle). It spread-modulates the reception signal to a correlated signal by using a reception PN code. It calculates whether or not there is an object, distance, relative velocity and the like based on the correlated signal obtained by performing the spread modulation.

Note that here, as an example, the radar apparatus 100 includes an intermediate-frequency oscillator 101, an oscillator 102, a balanced modulator 103, a balanced modulator 104, a PN code generator 105, a transmission signal band pass filter 106, a transmitting antenna 107, a receiving antenna 108, a low noise amplifier 109, a balanced modulator 110, a variable delay device 111, quadrature demodulators 112a, 112b, a 90-degree phase shifter 113, intermediate-frequency band pass filters 114a, 114b, logarithmic amplifiers 115a, 115b, frequency multipliers 116a, 116b and a divider 117.

Here, a transmitter 119a is made up of the intermediate-frequency oscillator 101, balanced modulator 103, balanced modulator 104, transmission signal band pass filter 106 and transmitting antenna 107. Furthermore, a receiver 119b is made up of the receiving antenna 108, low noise amplifier 109, balanced modulator 110, quadrature demodulators 112a, 112b, 90-degree phase shifter 113, intermediate-frequency band pass filters 114a, 114b and logarithmic amplifiers 115a, 115b.

The intermediate-frequency oscillator 101 generates an intermediate-frequency signal (a signal of several 10 kHz to several 100 kHz) of lower frequency than the high-frequency signal outputted from the oscillator 102, and outputs the generated intermediate-frequency signal. Here, as an example, an intermediate-frequency signal of 455 kHz is generated.

The oscillator 102 generates a high frequency signal (a signal of several GHz to several 10 GHz) such as a microwave and a millimeter wave, and outputs the generated high-frequency signal. Here, a high-frequency signal of 13 GHz frequency is generated as an example.

The balanced modulator 103 mixes the intermediate-frequency signal outputted from the intermediate-frequency oscillator 101 and a transmission local oscillation signal outputted from the frequency multiplier 116a, and outputs the signal obtained through the mixing as a modulation signal. Here, a transmission local oscillation signal of 26 GHz frequency and an intermediate-frequency signal of 455 kHz are mixed, and a modulation signal of upper sideband 26 GHz+455 kHz and lower sideband 26 GHz-455 kHz is outputted.

The balanced modulator 104 mixes the modulation signal outputted from the balanced modulator 103 and the PN code outputted from the PN code generator 105, and outputs the signal obtained through the mixing as a transmission signal. Here, a transmission signal of 26 GHz center frequency which is spread over a 3.8 GHz frequency band (±1.9 GHz) based on the binary phase shift keying method (BPSK method) is outputted.

The PN code generator 105 generates the PN code, and outputs the generated PN code. Here, a PN code, which is an M-series code, of chip rate 2.496 Gbps, code length $2^{11}-1$, approximately 2.5 GHz frequency band, is generated as an example.

The transmission signal band pass filter 106 passes a predetermined frequency component out of the transmission signal outputted from the balanced modulator 104. Here, a frequency component of several GHz to several 10 GHz is passed as an example.

The transmitting antenna 107 transmits the transmission signal outputted from the transmission signal band pass filter 106 as the radar wave. Here, an antenna of antenna gain 18.6 dBi, transmission power −26.5 dBm, and a transmission average EIRP (Equivalent Isotropic Radiated Power) −42 dBm/MHz is used as an example.

The receiving antenna 108 receives, as the reception signal, the reflected wave obtained by reflecting or scattering the radar wave transmitted from the transmitting antenna 107 off of the obstacle. Here, an antenna of antenna gain 18.6 dBi is used as an example.

The low noise amplifier 109 amplifies the reception signal (weak high-frequency signal) received by the receiving antenna 108, and outputs the signal obtained by the amplification as an amplified signal.

The balanced modulator 110 mixes the amplified signal outputted from the low noise amplifier 109 and the PN code outputted from the variable delay device 111, and outputs the signal obtained through the mixing as the correlated signal. Here, it outputs a correlated signal of 26 GHz±455 kHz obtained by inversely spreading the amplified signal of which spectrum is spread.

The variable delay device 111 delays the PN code outputted from the PN code generator 105, and outputs the delayed PN code.

The quadrature demodulator 112a mixes the correlated signal outputted from the balanced modulator 110 and reception local oscillation signal outputted from the frequency multiplier 116b, and outputs the signal obtained through the mixing as an I (in-phase) signal. Here, an I (in-phase) signal of an intermediate frequency is outputted.

The quadrature demodulator 112b mixes the correlated signal outputted from the balanced modulator 110 and a reception local oscillation signal outputted from the 90-degree phase shifter 113, and outputs the signal obtained through the mixing as a Q (quadrature) signal. Here, a Q (quadrature) signal of an intermediate frequency orthogonal to the I (in-phase) signal is outputted.

The 90-degree phase shifter 113 shifts the phase of the reception local oscillation signal outputted from the frequency multiplier 116b by 90 degrees, and outputs the signal obtained by the shifting.

The intermediate-frequency band pass filter 114a passes a predetermined frequency component out of the I (in-phase) signal outputted from the quadrature demodulator 112a. Here, a frequency component of several 10 kHz to several 100 kHz is passed as an example.

The intermediate-frequency band pass filter 114b passes a predetermined frequency component out of the Q (quadrature) signal outputted from the quadrature demodulator 112b. Here, a frequency component of several 10 kHz to several 100 kHz is passed as an example.

The logarithmic amplifier 115a outputs a signal proportional to a logarithm of intensity of the I (in-phase) signal outputted from the intermediate-frequency band pass filter 114a.

The logarithmic amplifier 115b outputs a signal proportional to a logarithm of intensity of the Q (quadrature) signal outputted from the intermediate-frequency band pass filter 114b.

The frequency multiplier 116a multiplies the high-frequency signal outputted from the divider 117 by a predetermined multiplication ratio, and outputs the signal obtained through the multiplication as a transmission local oscillation signal. Here, with the multiplication ratio of 2, a transmission local oscillation signal of 26 GHz frequency, obtained by multiplying the high-frequency signal of 13 GHz frequency by 2, is outputted as an example.

The frequency multiplier 116b multiplies the high-frequency signal outputted from the divider 117 by a predetermined multiplication ratio, and outputs the signal obtained by performing multiplication as reception local oscillation signal. Here, with the multiplication ratio of 2, a reception local oscillation signal of 26 GHz frequency, obtained by multiplying the high-frequency signal of 13 GHz frequency by 2, is outputted as an example.

The divider 117 divides the high-frequency signal outputted from the oscillator 102 to the frequency multiplier 116a and frequency multiplier 116b.

In addition, the radar apparatus 100 can obtain reflection intensity by performing signal processing on the I (in-phase) signal outputted from the logarithmic amplifier 115a and the Q (quadrature) signal outputted from the logarithmic amplifier 115b. Here, as radar performance, it is assumed that distance resolution is approximately 6 cm.

Note that it is also possible, as with a placement location 118a for instance, to place an amplifier made up of a differential circuit in the path connecting an output terminal of the frequency multiplier 116a with an input terminal of the balanced modulator 103. Thus, the transmission local oscillation signal outputted from the frequency multiplier 116a is amplified so that an output level of the frequency multiplier 116a can be adjusted. Furthermore, as the gain (reverse-gain) of the signal counter-flowing in the amplifier is reduced, it is possible to suppress the leakage of a reflected signal caused by to the transmission local oscillation signal, to the frequency multiplier 116b and the like.

Note that it is also possible, as with a placement location 118b for instance, to place an amplifier made up of a differential circuit in the path connecting an output terminal of the frequency multiplier 116b and an input terminal of the quadrature demodulator 112a. Thus, the reception local oscillation signal outputted from the frequency multiplier 116b is amplified, and an output level of the frequency multiplier 116b can be adjusted. Furthermore, as the gain (reverse gain) of the signal counter-flowing in the amplifier is reduced, it is possible to suppress the leakage of a reflected signal caused by the reception local oscillation signal, to the frequency multiplier 116a and the like.

Moreover, the oscillator 102 may be either made up of a differential circuit or made up of a single-ended circuit. In the case where the oscillator 102 is made up of a differential circuit, an input part and each output part of the divider 117 are also made up of differential circuits. In the case where the oscillator 102 is made up of a single-ended circuit, a conversion circuit for converting the single-ended signal outputted from the oscillator 102 to the differential signal, is placed in the path connecting the oscillator 102 and the divider 117.

Here, a single-ended signal is a signal which defines a signal level as an H level when it is at a first voltage or higher with reference to the ground, and defines the signal level as an L level when it is at a second voltage or lower, the second voltage being below the first voltage. One signal line is used for one single-ended signal.

In comparison, a differential signal is a pair of signals made up of a positive-side signal and a negative-side signal, which defines the signal level as the H level when a difference between an electric potential of the positive-side signal and that of the negative-side signal is positive, and defines the signal level as the L level when the difference between the electric potential of the positive-side signal and that of the negative-side signal is negative. A pair of signal lines (two signal lines) is used for one differential signal.

Note that the balanced modulators 103, 104, 110 and quadrature demodulators 112a, 112b are double-balanced mixers of a Gilbert cell method. The double-balanced mixer is made up of diodes and transformers, and is low-loss, high-isolation, low-distortion and capable of modulating the frequency.

Moreover, the balanced modulator 103 has at least an input part and an output part made up of differential circuits. It is thereby possible to suppress the leakage of the high-frequency signal inputted to the input unit, to the output unit. This is very important in detecting an object by using a radio wave. This is because, when the high-frequency signal leaks to the output unit, a signal having a high power level and a sharp peak is mixed with the signal spread over a broadband by the PN code. And when the signal which is mixed and obtained is transmitted and reflected by the obstacle, and the reflected wave obtained by the reflection is received, a signal component caused by leakage becomes a disturbing wave and deteriorates receiving characteristics.

In the case of making a concrete comparison with performance specifications of the radar apparatus, the receiving detection specification is required to meet the following specifications (1) and (2).

(1) Detection probability is 90% or higher.
(2) Error alarm probability is $10^{-10}$ or lower.

To meet the specifications, it is necessary, as an index indicating receiver (detection) sensitivity, to meet a requirement that the S/N ratio is larger than 15.2 dB. In the case where the isolation cannot be secured and a 26 GHz-band signal leaks on the receiver side, however, the S/N ratio deteriorates so that this requirement can no longer be met. Nevertheless, the radar apparatus 100 of the present embodiment can secure the isolation and thereby meet this requirement.

Next, a description will be given as to the configuration of the frequency multipliers 116a, 116b of the present embodiment. Note that, since the frequency multipliers 116a and 116b have the same circuit configuration, only the frequency multiplier 116a will be described by omitting a description of the frequency multiplier 116b.

Figure 6:
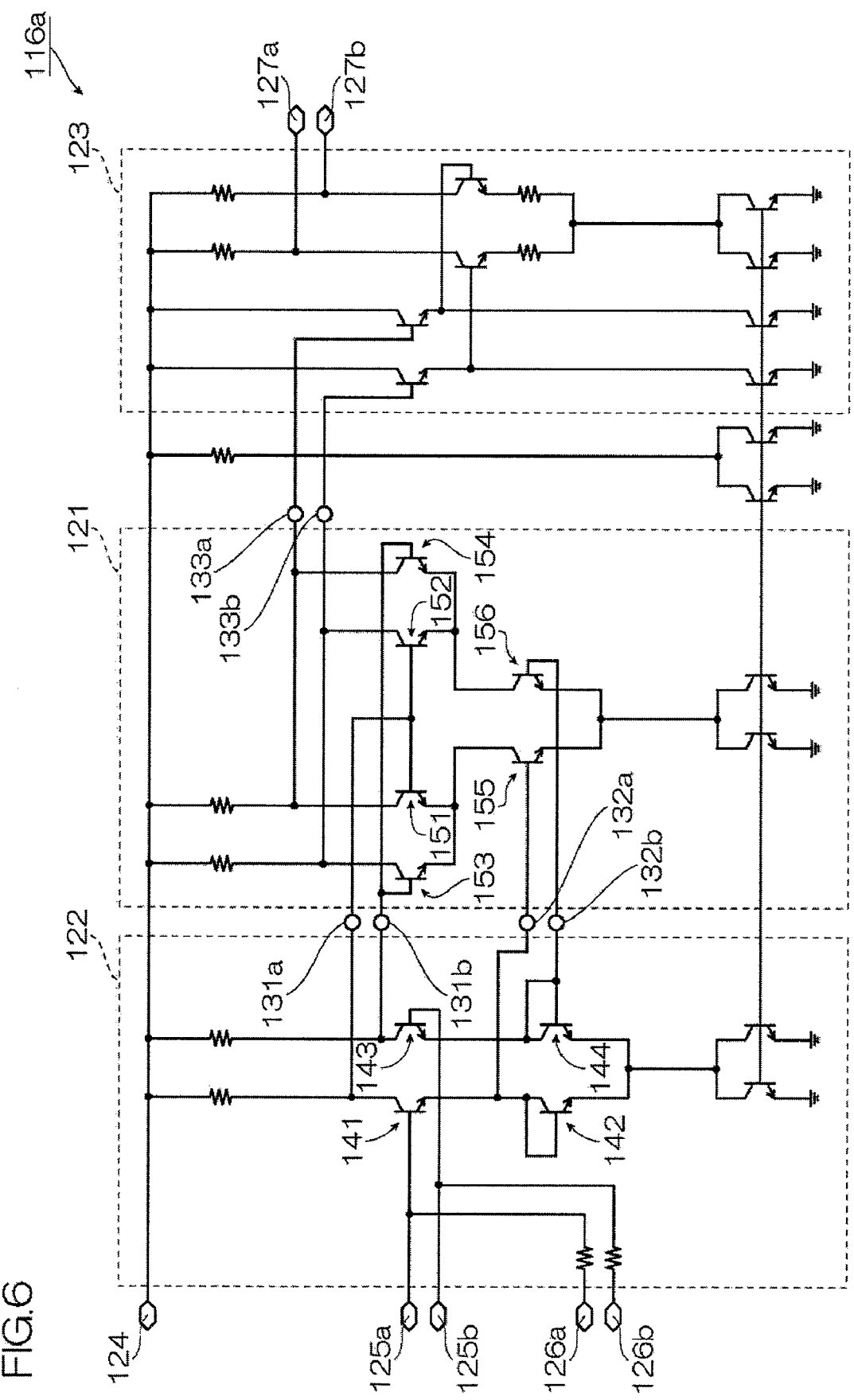
FIG. 6 is a diagram showing the configuration of a frequency multiplier of the first embodiment according to the present invention.

FIG. 6 is a diagram showing the configuration of the frequency multiplier 116a of the present embodiment. As shown in FIG. 6, the frequency multiplier 116a includes a Gilbert cell mixer 121, an input buffer circuit 122 and an output buffer circuit 123.

The Gilbert cell mixer 121 is a double-balanced mixer of a Gilbert cell method, which is a circuit for functioning as a multiplier. The input buffer circuit 122 is a circuit which is placed on an input side of the Gilbert cell mixer 121 and functions as an input buffer. The output buffer circuit 123 is a circuit which is placed on an output side of the Gilbert cell mixer 121 and functions as an output buffer.

These circuits are made up of the differential circuits. Gallium arsenide (GaAs)-series hetero bipolar transistors (HBTs) are used for active elements which constitute these circuits. Note that it is also possible to use one of silicon (Si)-series HBTs, CMOS, GaAs and InP-series heterojunction field-effect transistors (HFETs), instead of the GaAs-series HBTs.

To be more precise, a differential signal of 13 GHz frequency (hereinafter, referred to as an input differential signal) is inputted to input terminals 125a, 125b. Consequently, the voltage inputted from a power supply terminal 124 is changed according to the signal level of the input differential signal, and inputted to LO terminals 131a, 131b as a differential signal (hereinafter, referred to as an LO differential signal). The input differential signal is level-shifted in the input buffer circuit 122, and then is inputted to RF terminals 132a, 132b as a differential signal (hereinafter, referred to as an RF differential signal) having a phase difference of 90 degrees with respect to the LO differential signal. In the Gilbert cell mixer 121, the LO differential signal is multiplied by the RF differential signal, and a differential signal including a frequency component of 26 GHz frequency (hereinafter, referred to as an IF differential signal) is outputted from IF terminals 133a, 133b. Thus, a differential signal of 26 GHz frequency is outputted from output terminals 127a, 127b.

Note that here, each size of transistors 141, 142, width, length and the like of the lines for mutually connecting the transistors are designed so that the phase difference between the positive-side signal of the LO differential signal inputted to the LO terminal 131a and the positive-side signal of the RF differential signal inputted to the RF terminal 132a becomes 90 degrees. In addition, each size of transistors 143, 144, width, length and the like of the lines for mutually connecting the transistors are designed so that the phase difference between the negative-side signal of the LO differential signal inputted to the LO terminal 131b and the negative-side signal of the RF differential signal inputted to the RF terminal 132b becomes 90 degrees.

Moreover, when each frequency of the LO differential signal and the RF differential signal is $f_0$, the IF differential signal is indicated by the following formula (1). Here, the right side of the following formula (1) includes a second harmonic component of $f_0$, thereby indicating multiplication by 2 by the frequency multiplier 116a.

[Formula 1]

$$A\cos(f_0) \times B\cos(f_0) = (C\cos(2f_0) + D)/2 \quad (1)$$

Next, a description will be given as to the principle of operation of the Gilbert cell mixer 121 of the present embodiment.

Figure 7:
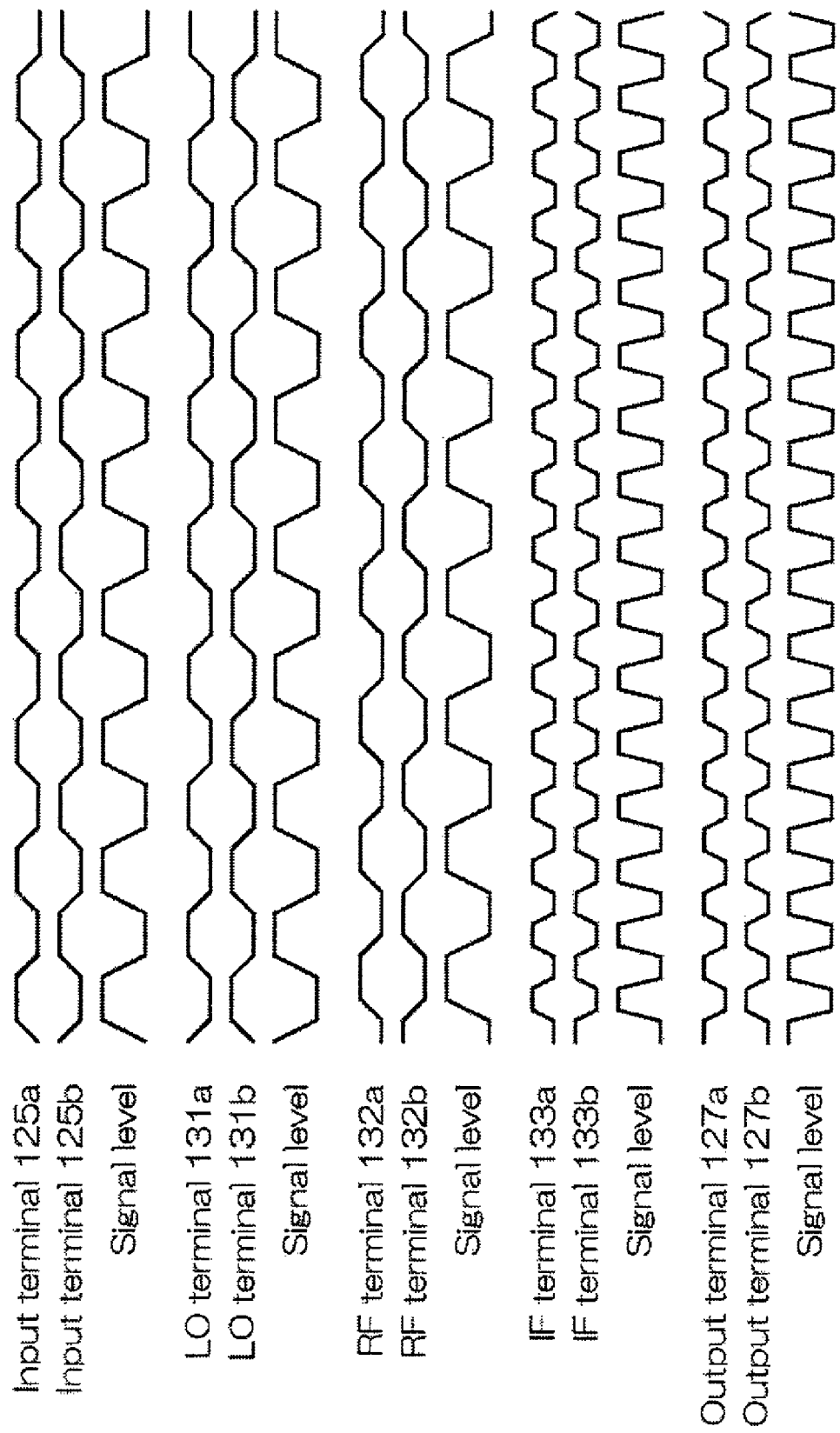
FIG. 7 is a diagram showing a principle of operation of a Gilbert cell mixer of the first embodiment according to the present invention in the case where a rectangular wave is are used as a differential signal.
Figure 8:
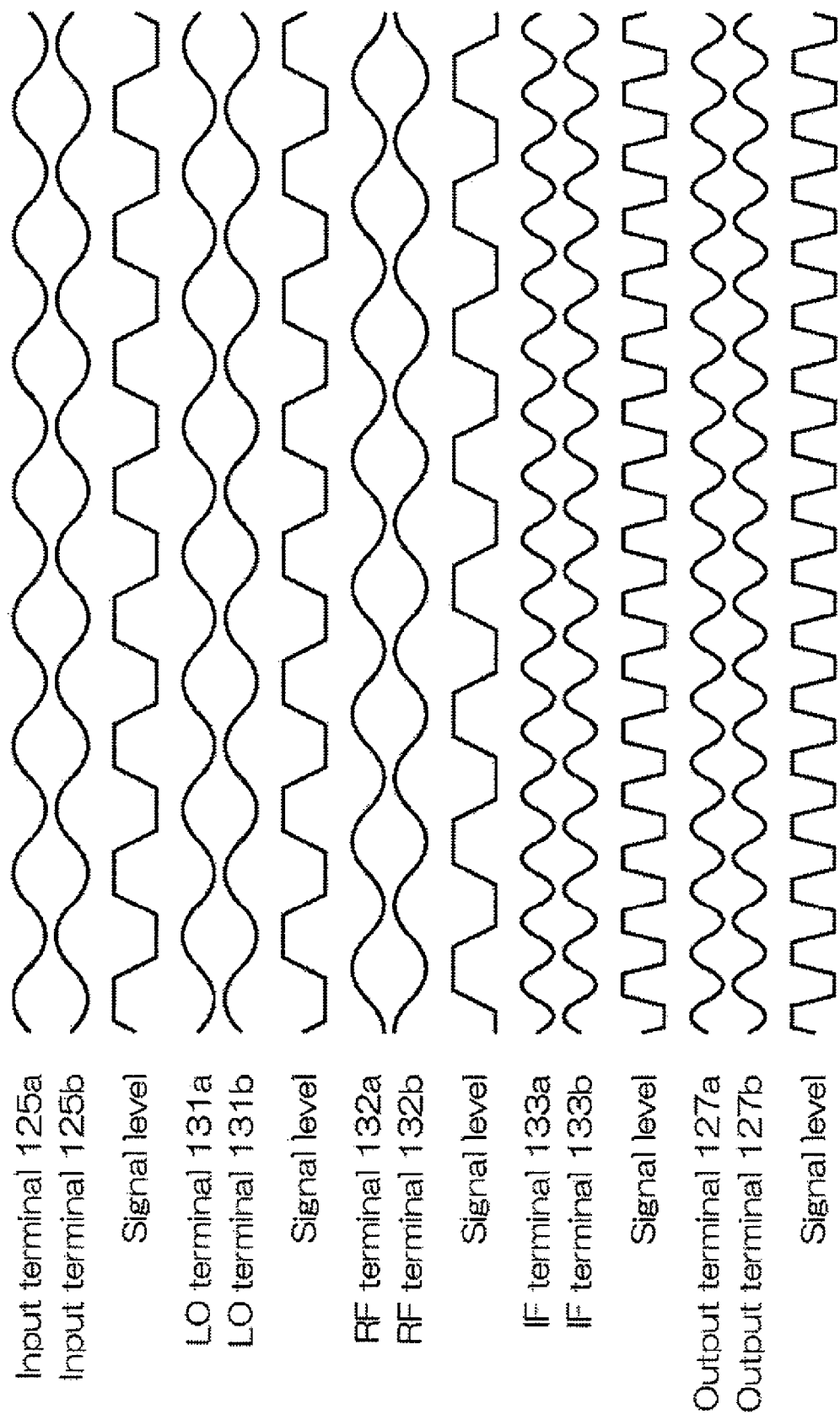
FIG. 8 is a diagram showing a principle of operation of a Gilbert cell mixer of the first embodiment according to the present invention in the case where a sine wave is used as the differential signal.

FIG. 7 is a diagram showing the principle of operation of the Gilbert cell mixer 121 of the present embodiment in the case where a rectangular wave is used as a differential signal. FIG. 8 is a diagram showing the principle of operation of the Gilbert cell mixer 121 of the present embodiment in the case where the sine wave is used as the differential signal. Moreover, as shown in FIG. 8, it is the same even in the case where a sine wave is used instead of the rectangular wave. Here, only the case where a rectangular wave is used will be described, and description of the case where the sine wave is used will be omitted.

As shown in FIG. 7, the LO differential signal (rectangular wave) of 13 GHz frequency is inputted to the LO terminals 131a, 131b. And the RF differential signal (rectangular wave) of 13 GHz frequency having the phase difference of 90 degrees from the LO differential signal is inputted to the RF terminals 132a, 132b.

In this case, the state of each of transistors 151 and 152 becomes either a conducting (on) state or a non-conducting (off) state according to the electric potential of the positive-side signal of the LO differential signal (rectangular wave). The state of each of transistors 153 and 154 becomes either the conducting (on) state or the non-conducting (off) state according to the electric potential of the negative-side signal of the LO differential signal (rectangular wave). The state of a transistor 155 becomes either the conducting (on) state or the non-conducting (off) state according to the electric potential of the positive-side signal of the RF differential signal (rectangular wave). The state of a transistor 156 becomes either the conducting (on) state or the non-conducting (off) state according to the electric potential of the negative-side signal of the RF differential signal (rectangular wave).

For instance, when the signal level of the LO differential signal is the H level, the state of each of the transistors 151 and 152 becomes the conducting (on) state while the state of each of the transistors 153 and 154 becomes the non-conducting (off) state. When the signal level of the LO differential signal is the L level, the state of each of the transistors 151 and 152 becomes the non-conducting (off) state while the state of each of the transistors 153 and 154 becomes the conducting (on) state. When the signal level of the RF differential signal is the H level, the state of the transistor 155 becomes the conducting (on) state while the state of the transistor 156 becomes the non-conducting (off) state. When the signal level of the RF differential signal is the L level, the state of the transistor 155 becomes the non-conducting (off) state while the state of the transistor 156 becomes the conducting (on) state.

Consequently, when the signal level of the LO differential signal is the H level and the signal level of the RF differential signal is the H level, the signal level of the IF differential signal becomes the H level. When the signal level of the LO differential signal is the H level and the signal level of the RF differential signal is the L level, the signal level of the IF differential signal becomes the L level. When the signal level of the LO differential signal is the L level and the signal level of the RF differential signal is the H level, the signal level of the IF differential signal becomes the L level. When the signal level of the LO differential signal is the L level and the signal level of the RF differential signal is the L level, the signal level of the IF differential signal becomes the H level.

As a result, an IF differential signal (rectangular wave) of 26 GHz frequency is outputted from the IF terminals 133a, 133b.

Note that in the frequency multiplier 116a, the respective biases of the transistors 141, 143 to which the input differential signal is inputted, are adjusted via bias terminals 126a, 126b. It is thereby possible to suppress the leakage of the input differential signal to the output terminals 127a, 127b side. It is also possible to suppress the leakage of the output differential signal to the input terminals 125a, 125b side. As a result, it is possible to secure isolation. To be more precise, a voltage determined to minimize the leakage of a high-frequency signal of a 13 GHz band is inputted to the bias terminals 126a, 126b.

Figure 9:
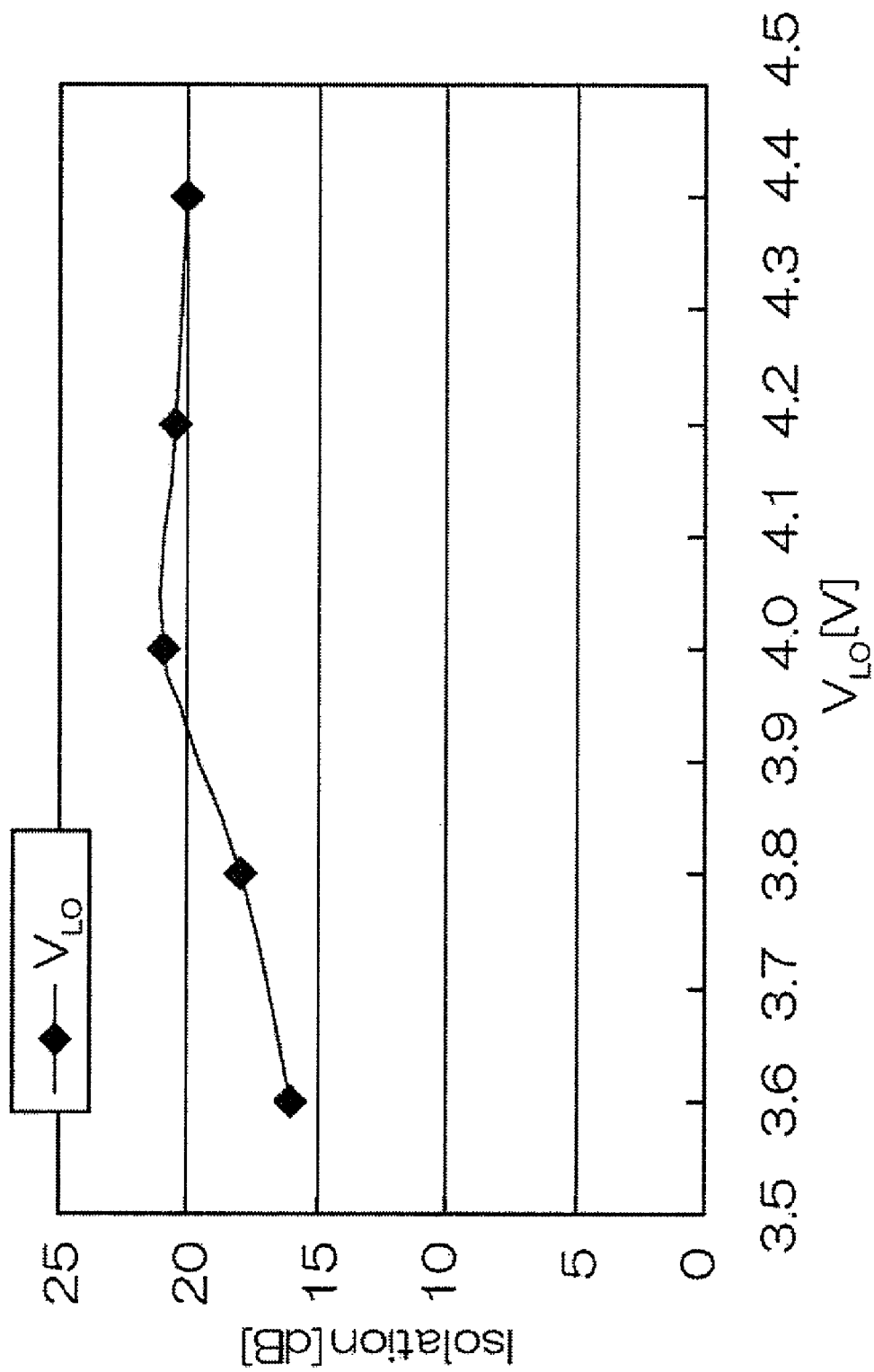
FIG. 9 is a diagram showing a relation between isolation characteristics and bias voltage dependency of the frequency multiplier of the first embodiment according to the present invention.

FIG. 9 is a diagram showing a relation between isolation characteristics and bias voltage dependency of the frequency multiplier 116a of the present embodiment. As shown in FIG. 9, it is possible to set the isolation to the maximum by applying the voltage of 4.0 V to the bias terminals 126a, 126b.

As described above, since the radar apparatus 100 of the present embodiment includes the frequency multipliers 116a, 116b, it is possible to suppress the leakage of the transmission local oscillation signal to the quadrature demodulators 112a, 112b. It is also possible to prevent the leakage of the reception local oscillation signal to the balanced modulator 103. It is thereby possible to secure isolation for a first path connecting the balanced modulator 103 and the quadrature demodulator 112a. Similarly, it is possible to secure isolation for a second path connecting the balanced modulator 103 and the quadrature demodulator 112b. It is not necessary to heighten the output level of the oscillator 102 in comparison with the case where an isolator and an attenuator are placed in an intersection of the first path and the second path, and so it is possible to suppress an increase in power consumption.

As a result, the radar apparatus 100 can suppress the leakage of a high-frequency signal and avoid including an unnecessary signal component in a transmission signal. For this reason, the reception signal does not include a disturbing wave which is caused by the leakage and which deteriorates reception characteristics, and thus detection for identifying the obstacle can be correctly performed.

The radar apparatus 100 can secure the isolation and thereby avoid deterioration of the S/N ratio, and meet the requirements of the following specifications (1) and (2) which are required as the receiving detection specifications of the radar apparatus.

(1) Detection probability is 90% or higher.
(2) Error alarm probability is $10^{-10}$ or lower.

Note the input buffer circuit 122 may also have a function as a differential amplifier.

Figure 10:
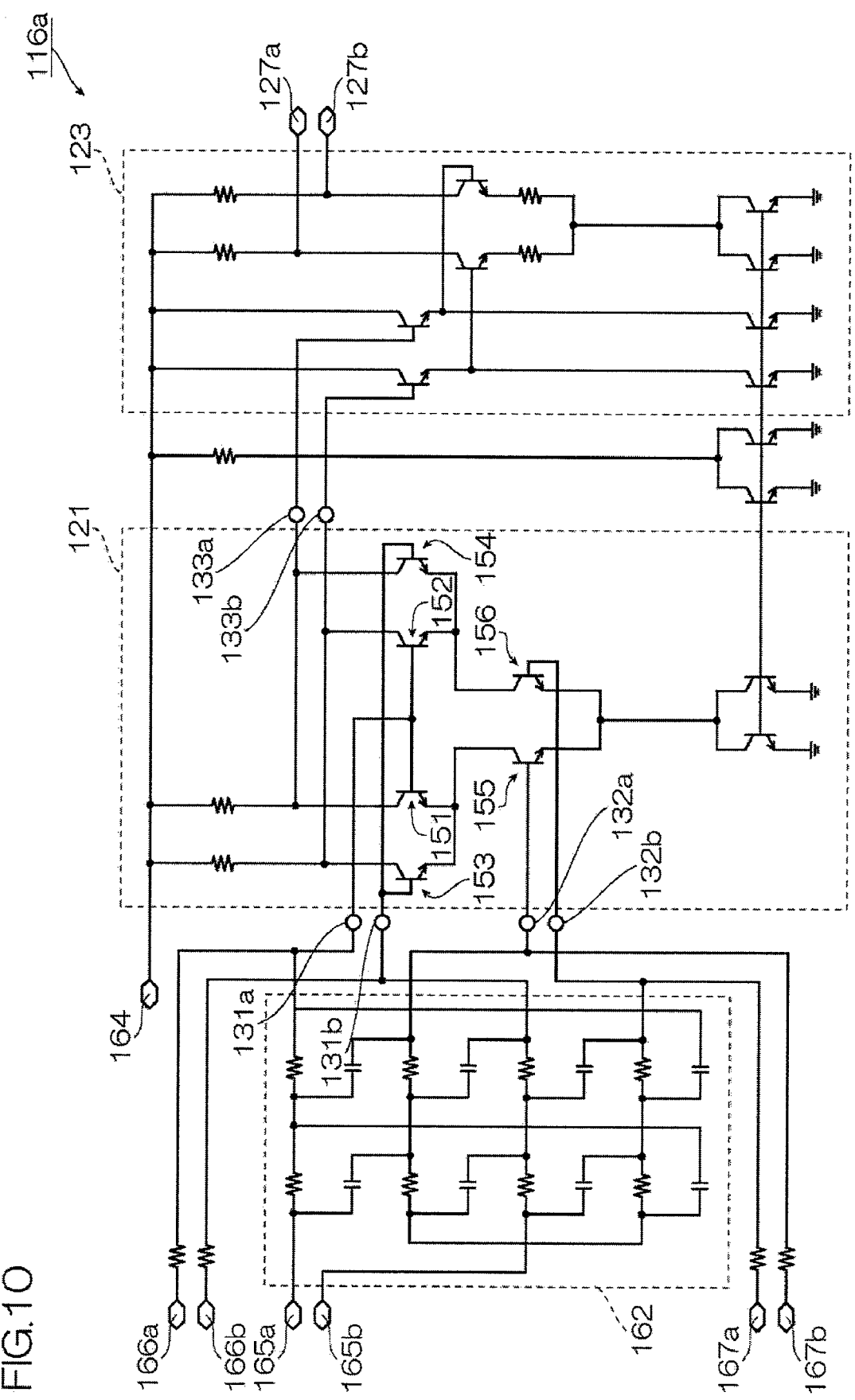
FIG. 10 is a diagram showing the configuration of the frequency multiplier as a variation of the first embodiment according to the present invention.

Moreover, as shown in FIG. 10, the frequency multiplier 116a may include a polyphase filter 162 instead of the input buffer circuit 122. Furthermore, the respective biases of the transistors 151, 152, 153 and 154, to which the LO differential signal is inputted, may be adjusted via bias terminals 166a, 166b. Moreover, the respective biases of the transistors 155, 156, to which the RF differential signal is inputted, may be adjusted via bias terminals 167a, 167b.

Here, the polyphase filter 162 is made up of a two-stage RC polyphase circuit. Furthermore, when the input differential signal is inputted to input terminals 165a, 165b, the LO differential signal is outputted and is inputted to the LO terminals 131a, 131b. And the RF differential signal having a phase difference of 90 degrees from the LO differential signal is outputted and is inputted to the RF terminals 132a, 132b.

When each frequency of the LO differential signal and the RF differential signal is $f_0$, $A\cos(f_0)$, $B\sin(f_0)$ are outputted from the polyphase filter 162, and the IF differential signal is indicated by the following formula (2). Here, the right side of the following formula (2) includes a doubled $f_0$ wave component, thereby indicating that it is multiplied by 2 by the frequency multiplier 116a.

[Formula 2]

$$A\cos(f_0) \times B\sin(f_0) = C\sin(2f_0)/2 \quad (2)$$

Note that although the configuration block of a transmission modulator and the configuration block of the receiving demodulator are described above, the same is also applicable to the blocks having the functions of a transmission frequency conversion unit and a reception frequency conversion unit, and the same effects can be obtained.

Second Embodiment

Hereinafter, a second embodiment according to the present invention will be described with reference to the drawings.

The radar apparatus of the present embodiment has the characteristics indicated by the following (1) to (n).

(l) (l1) The transmitter includes a first mixer which mixes the differential signal obtained through the multiplication by the transmission multiplier and the pseudo-noise code generated by the pseudo-noise code generator, so as to generate the signal to be transmitted as the radar wave, (l2) the receiver includes: (l2-1) an offset clock which generates an intermediate-frequency clock signal, (l2-2) an exclusive-OR calculating unit which calculates an exclusive-OR between the pseudo-noise code delayed by the delay device and the intermediate-frequency clock signal generated by the offset clock, (l2-3) a second mixer which mixes the signal obtained by the calculating of the exclusive-OR by the exclusive-OR calculating unit and the reflected wave, so as to inversely spread the reflected wave of which spectrum is spread, and (l2-4) a third mixer which mixes the signal obtained through the mixing by the second mixer and the differential signal obtained through the multiplication by the reception multiplier, so as to generate the first demodulated signal of an intermediate frequency, (l2-5) a phase shifter which shifts, by 90 degrees, a phase of the differential signal obtained through the multiplication by the reception multiplier, and (l2-6) a fourth mixer which mixes the signal obtained through the mixing by the second mixer and the differential signal obtained through the phase shifting by the phase shifter, so as to generate the second demodulated signal of an intermediate frequency.

(m) (m1) The transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (m2) a virtual ground of the first amplifier circuit and a virtual ground of the second amplifier circuit are electrically connected, via a via hole, with a ground layer formed on a backside of a semiconductor substrate on which the differential amplifier circuit is formed.

(n) (n1) The reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (n2) a virtual ground of the first amplifier circuit and a virtual ground of the second amplifier circuit are electrically connected, via a via hole, with a ground layer formed on a backside of a semiconductor substrate on which the differential amplifier circuit is formed.

Note that the radar apparatus of the present embodiment may also have the characteristics indicated in the following (o) or (p), instead of the above (m).

(o) (o1) The transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (o2) a virtual ground of the first amplifier circuit and a virtual ground of the second amplifier circuit are electrically connected, via a via hole, with a ground layer formed in a layer portion lower than the portion in which the differential amplifier circuit is formed, in a semiconductor substrate on which the differential amplifier circuit is formed.

(p) (p1) the transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (p2) a virtual ground of the first amplifier circuit and a virtual ground of the second amplifier circuit are electrically connected, via a via hole, with a ground layer formed in a layer portion higher than the portion in which the differential amplifier circuit is formed, in a semiconductor substrate on which the differential amplifier circuit is formed.

Note that the radar apparatus of the present embodiment may also have the characteristics indicated in the following (q) and (r), instead of the above (n).

(q) (q1) The reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (q2) a virtual ground of the first amplifier circuit and a virtual ground of the second amplifier circuit are electrically connected, via a via hole, with a ground layer formed in a layer portion lower than the portion in which the differential amplifier circuit is formed, in a semiconductor substrate on which the differential amplifier circuit is formed.

(r) (r1) The reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and (r2) a virtual ground of the first amplifier circuit and a virtual ground of the second amplifier circuit are electrically connected, via a via hole, with a ground layer formed in a layer portion higher than the portion in which the differential amplifier circuit is formed, in a semiconductor substrate on which the differential amplifier circuit is formed.

The radar apparatus of the present embodiment will be described based on the above points. Note that the same constituent elements as in the first embodiment will be given the same reference number, and a description thereof will be omitted.

First, the configuration of the radar apparatus of the present embodiment will be described.

Figure 11:
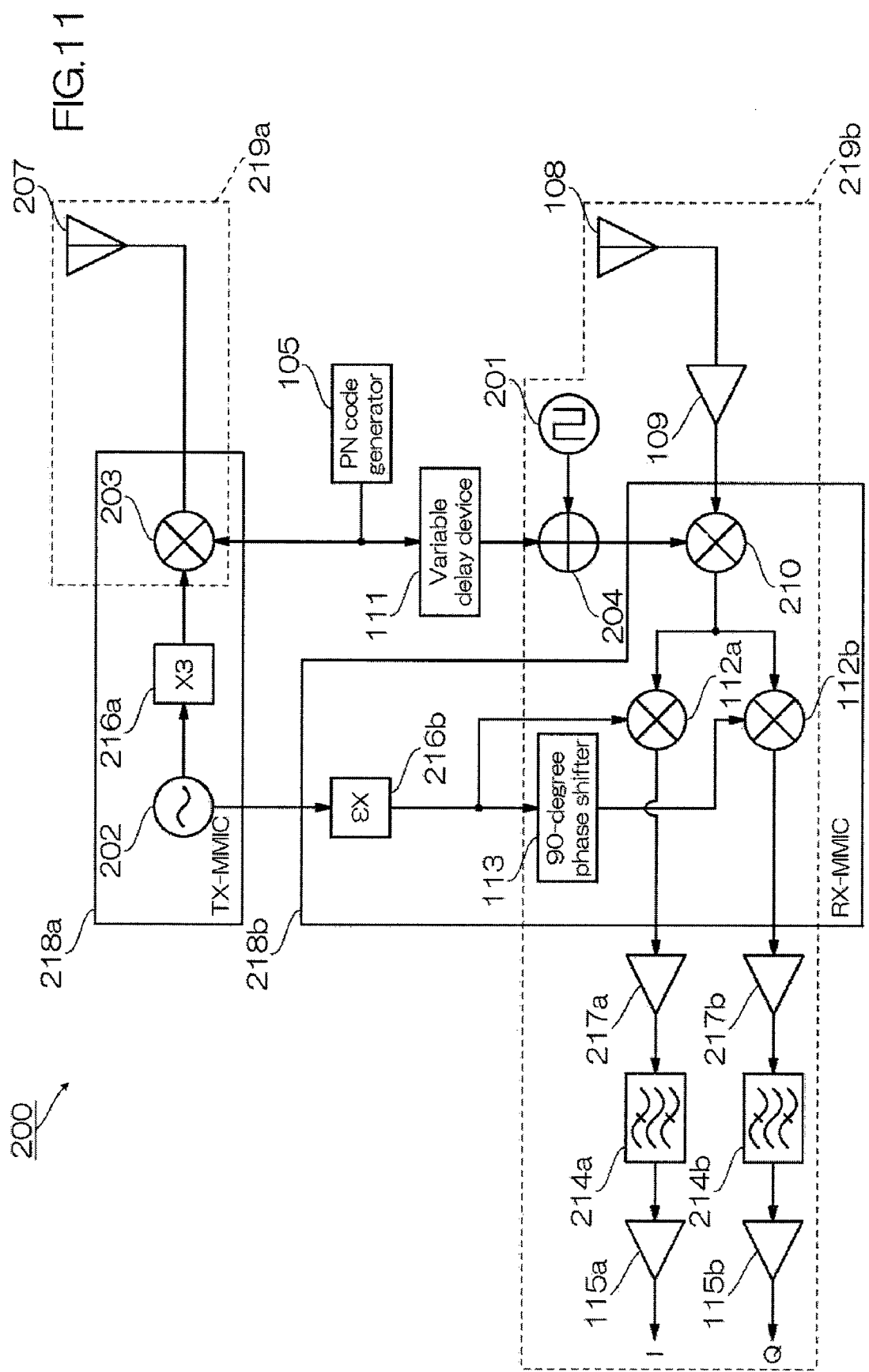
FIG. 11 is a diagram showing the configuration of the radar apparatus of a second embodiment according to the present invention.

FIG. 11 is a diagram showing the configuration of the radar apparatus of the present embodiment. As shown in FIG. 11, a radar apparatus 200 is different from the radar apparatus 100 of the first embodiment on the following points. Moreover, as for the radar apparatus 200, the distance resolution is approximately 6 cm as radar performance.

(1) The radar apparatus 200 includes an oscillator 202, a balanced modulator 203, a transmitting antenna 207, a balanced modulator 210, intermediate-frequency band pass filters 214a, 214b and frequency multipliers 216a, 216b instead of the oscillator 102, balanced modulator 103, transmitting antenna 107, balanced modulator 110, intermediate-frequency band pass filters 114a, 114b and frequency multipliers 116a, 116b.

(2) The radar apparatus 200 newly includes an offset clock 201, an exclusive-OR calculating unit 204 and intermediate-frequency band signal amplifiers 217a, 217b.

Note that, since the radar apparatus 200 includes the offset clock 201 and the exclusive-OR calculating unit 204, it embeds a clock signal in the PN code itself by digital processing when generating a reception PN code. It is thereby possible to eliminate a direct-current component (DC offset) generated when demodulating the reception signal by a homodyne method. The radar apparatus 200 does not require a millimeter waveband modulator which is normally required for offset modulation. It can also eliminate a wraparound of an offset frequency due to a through leak of the modulator or the like and other internal interferences between the transmitter and the receiver. Thus, it can realize a high-performance radar apparatus while suppressing the cost of the part handling a millimeter waveband signal.

(3) The radar apparatus 200 does not include the intermediate-frequency oscillator 101 and balanced modulator 104. Note that here, the transmission signal band pass filter 106 and the divider 117 are omitted to simplify the description.

Moreover, here, a transmitter 219a is made up of the balanced modulator 203 and transmitting antenna 207. Furthermore, a receiver 219b is made up of the receiving antenna 108, low noise amplifier 109, balanced modulator 210, quadrature demodulators 112a, 112b, 90-degree phase shifter 113, intermediate-frequency band pass filters 214a, 214b, logarithmic amplifiers 115a, 115b and intermediate-frequency band signal amplifiers 217a, 217b.

The offset clock 201 generates an intermediate-frequency clock signal (a rectangular wave signal of several 10 kHz to several 100 kHz) of lower frequency than the high-frequency signal outputted from the oscillator 202, and outputs the generated intermediate-frequency clock signal. Here, an intermediate-frequency clock signal of 455 kHz is generated as an example.

The oscillator 202 generates a high-frequency signal (a signal of several GHz to several 10 GHz) such as a microwave and a millimeter wave, and outputs the generated high-frequency signal. Here, a high-frequency signal of 8.8 GHz frequency is generated as an example.

The balanced modulator 203 mixes the transmission local oscillation signal outputted from the frequency multiplier 216a and the PN code outputted from the PN code generator 105, and outputs the signal obtained through the mixing as the transmission signal. Here, a transmission signal of 26.4 GHz center frequency which is spread over the 3.8 GHz frequency band (±1.9 GHz) based on the binary phase shift keying method (BPSK method) is outputted.

The exclusive-OR calculating unit 204 mixes the intermediate-frequency clock signal outputted from the offset clock 201 and the PN code outputted from the variable delay device 111, and outputs the signal obtained through the mixing as the reception PN code.

The transmitting antenna 207 transmits the transmission signal outputted from the balanced modulator 203 as the radar wave. Here, an antenna of antenna gain 18.6 dBi, transmission power −26.5 dBm and transmission average EIRP (Equivalent Isotropic Radiated Power) −42 dBm/MHz is used as an example.

The balanced modulator 210 mixes the amplified signal outputted from the low noise amplifier 109 and the reception PN code outputted from the exclusive-OR calculating unit 204, and outputs the signal obtained through the mixing as the correlated signal. Here, it outputs a correlated signal of 26.4 GHz±455 kHz obtained by inversely spreading the amplified signal of which spectrum is spread.

The intermediate-frequency band pass filter 214a passes a predetermined frequency component (a frequency component of several 10 kHz to several 100 kHz) out of the I (in-phase) signal outputted from the intermediate-frequency band signal amplifier 217a. Here, a frequency component having an intermediate-frequency bandwidth of 15 kHz is passed as an example.

The intermediate-frequency band pass filter 214b passes a predetermined frequency component (a frequency component of several 10 kHz to several 100 kHz) out of the Q (quadrature) signal outputted from the intermediate-frequency band signal amplifier 217b. Here, a frequency component having an intermediate-frequency bandwidth of 15 kHz is passed as an example.

The frequency multiplier 216a multiplies the high-frequency signal outputted from the oscillator 202 by a predetermined multiplication ratio, and outputs the signal obtained by performing the multiplication as the transmission local oscillation signal. Here, with the multiplication ratio of 3, a transmission local oscillation signal of 26.4 GHz frequency, obtained by multiplying the high-frequency signal of 8.8 GHz frequency by 3, is outputted as an example.

The frequency multiplier 216b multiplies the high-frequency signal outputted from the oscillator 202 by a predetermined multiplication ratio, and outputs the signal obtained by performing the multiplication as the reception local oscillation signal. Here, with the multiplication ratio of 3, a reception local oscillation signal of 26.4 GHz frequency, obtained by multiplying the high-frequency signal of 8.8 GHz frequency by 3, is outputted as an example.

The intermediate-frequency band signal amplifier 217a amplifies the I (in-phase) signal outputted from the quadrature demodulator 112a, and outputs the signal obtained by performing the amplification.

The intermediate-frequency band signal amplifier 217b amplifies the I (in-phase) signal outputted from the quadrature demodulator 112b, and outputs the signal obtained by performing the amplification.

For instance, the oscillator 202, balanced modulator 203 and frequency multiplier 216a are individually mounted on the substrate. In this case, the high-frequency signal of 26.4 GHz frequency and high-frequency signal of 8.8 GHz frequency leak on the output side of the balanced modulator 203 due to parasitic components of the substrate (IC chip assembly board).

Thus, the radar apparatus 200 of the present embodiment has the oscillator 202, the balanced modulator 203, and the frequency multiplier 216a integrated into one chip, in the form of an MMIC (Monolithic Microwave Integrated Circuit).

Figure 12:
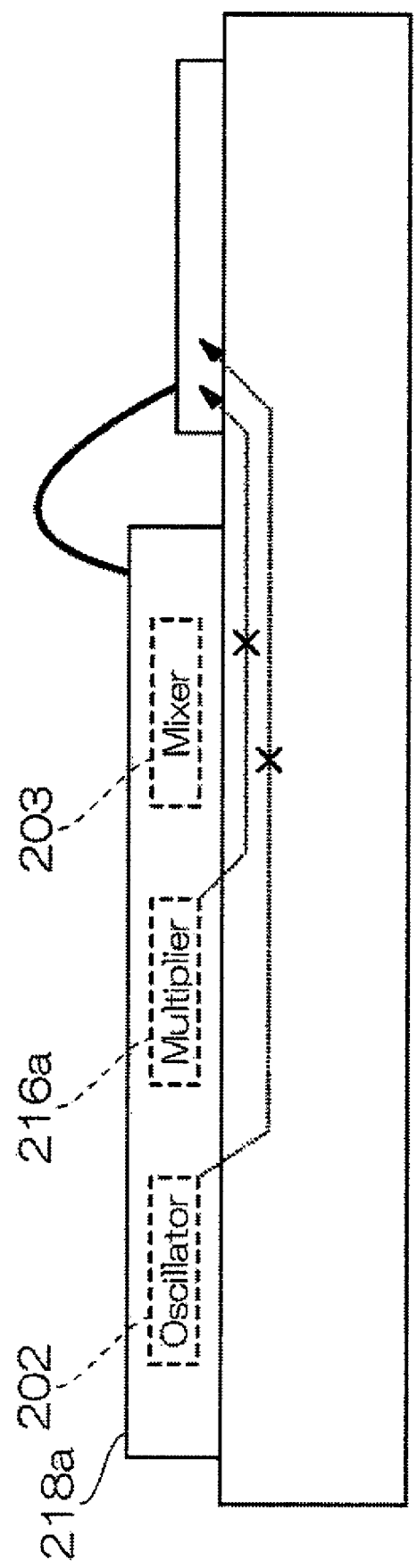
FIG. 12 is a diagram showing a package configuration of the radar apparatus of the second embodiment according to the present invention.

FIG. 12 is a diagram showing a package configuration of the radar apparatus 200 of the present embodiment. As shown in FIG. 12, the oscillator 202, balanced modulator 203, and frequency multiplier 216a are integrated into one chip, in the form of a TX-MMIC 218a. The quadrature demodulators 112a, 112b, 90-degree phase shifter 113, balanced modulator 210, and frequency multiplier 216b are integrated into one chip in the form of an RX-MMIC 218b.

Thus, it is possible to suppress the leakage of the high-frequency signal of 26.4 GHz frequency and the high-frequency signal of 8.8 GHz frequency and the like, caused by the parasitic components of the substrate (IC chip assembly board), in the path connecting the TX-MMIC 218a and the RX-MMIC 218b. It is also possible to suppress the leakage the high-frequency signal of 26.4 GHz frequency and the high-frequency signal of 8.8 GHz frequency and the like, caused by the parasitic components of the substrate (IC chip assembly board) on the output side of the TX-MMIC 218a.

Next, the configuration of the frequency multipliers 216a, 216b of the present embodiment will be described. Note that since the frequency multipliers 216a, 216b have the same configuration, only the frequency multiplier 216a will be described, and a description of the frequency multiplier 216b will be omitted.

Figure 13:
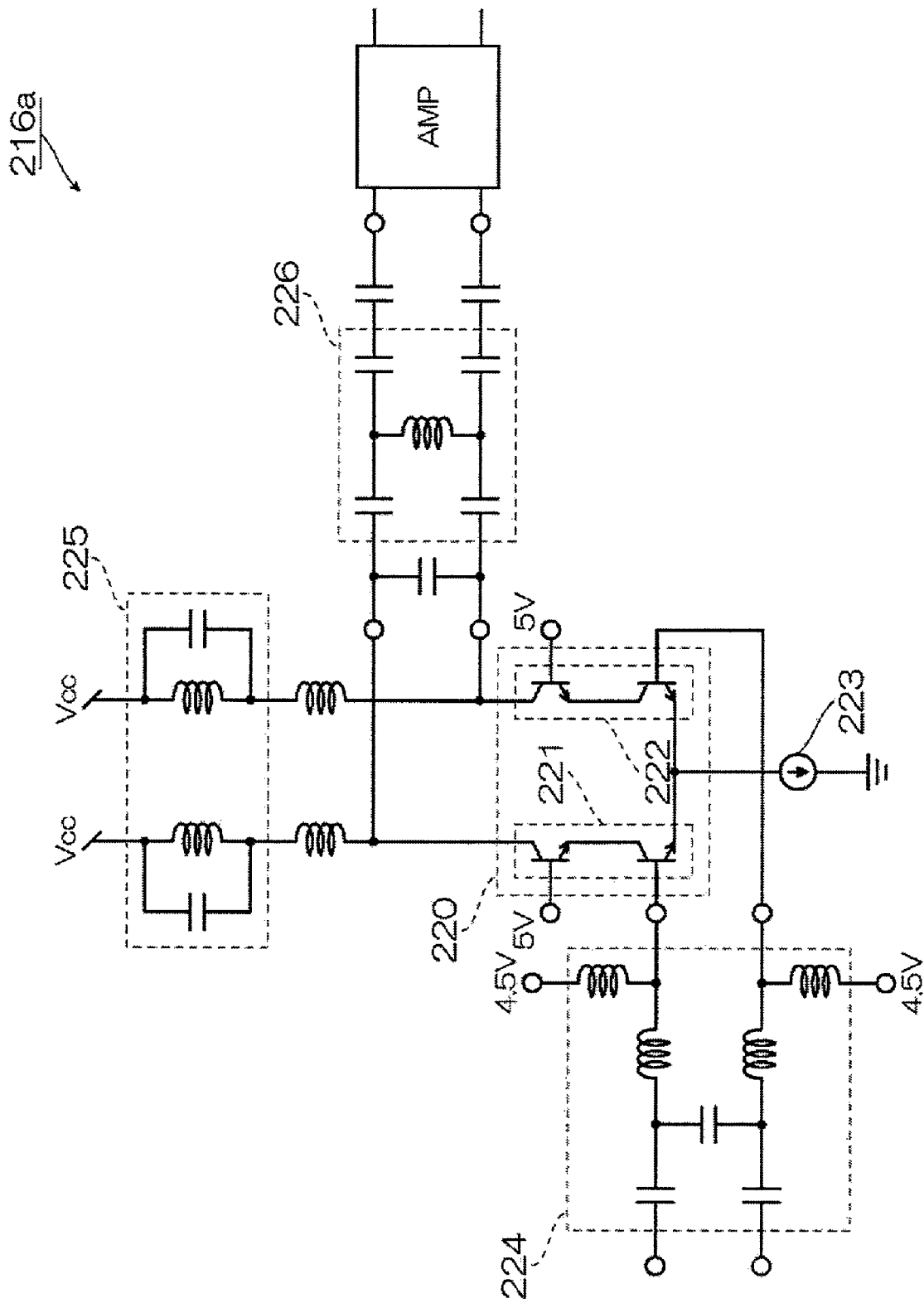
FIG. 13 is a diagram showing the configuration of the frequency multiplier of the second embodiment according to the present invention.

FIG. 13 is a diagram showing the configuration of the frequency multiplier 216a of the present embodiment. As shown in FIG. 13, the frequency multiplier 216a is made up of a tripler using a cascode-connected difference amplifier 220.

Here, as an example, the frequency multiplier 216a includes cascode-connected amplifiers 221, 222, a constant current source 223, an input matching circuit 224, a second harmonic wave suppressing circuit 225, and a high-frequency pass matching circuit 226. The differential amplifier 220 is made up of the cascode-connected amplifiers 221, 222.

The cascode-connected amplifier 221 is made up of a grounded-emitter GaAs HBT and a grounded-base GaAs HBT which are cascode-connected.

The cascode-connected amplifier 222 is made up of the grounded-emitter GaAs HBT and the grounded-base GaAs HBT which are cascode-connected.

The constant current source 223 is connected to an emitter terminal of a grounded-emitter part of the cascode-connected amplifier 221. It is also connected to the emitter terminal of the grounded-emitter part of the cascode-connected amplifier 222.

The input matching circuit 224 is configured to be able to obtain impedance matching at 8.8 GHz frequency with a differential signal inputted to input terminals 227a, 227b.

The second harmonic wave suppressing circuit 225 is connected to each collector power supply part of the cascode-connected amplifiers 221a, 221b. It resonates at 17.6 GHz frequency, and suppresses the high-frequency signal of 17.6 GHz frequency which is a second harmonic wave of the 8.8 GHz frequency.

The high-frequency pass matching circuit 226 is connected to each output part of the cascode-connected amplifiers 221a, 221b. It is configured so as not to pass the signal of 18 GHz or less frequency. It is further configured to be able to obtain impedance matching at 26.4 GHz frequency.

Note that, in the case where a desired output voltage cannot be obtained, it is possible to obtain a sufficient output voltage for the balanced modulator 203 and the quadrature demodulators 112a, 112b to perform modulation and demodulation by adopting a multistage configuration for the differential amplifier.

Figure 14:
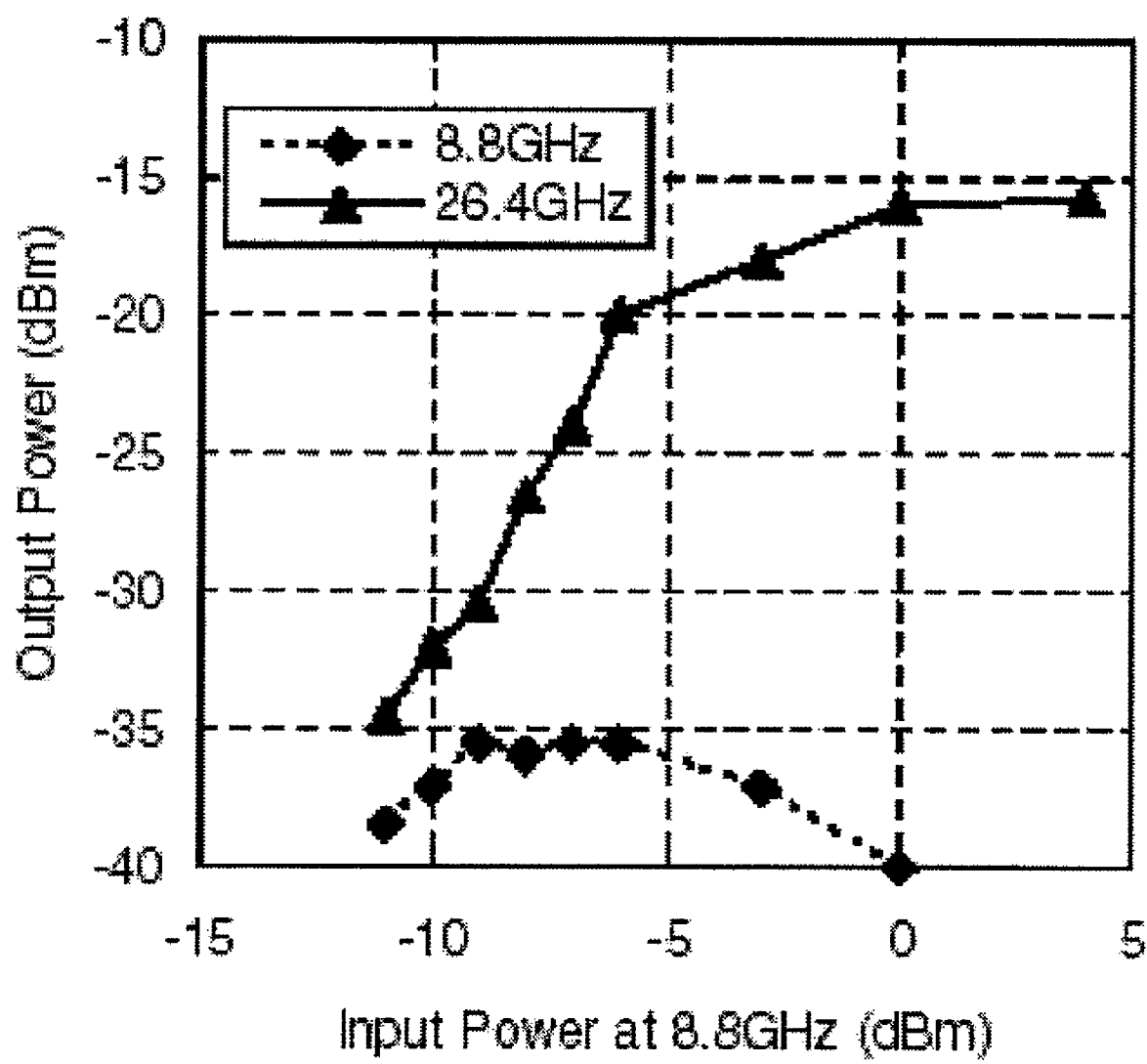
FIG. 14 is a diagram showing input-output characteristics of the frequency multiplier of the second embodiment according to the present invention.

FIG. 14 is a diagram showing input-output characteristics of the frequency multiplier 216a of the present embodiment. As shown in FIG. 14, when a differential signal of 8.8 GHz frequency and 0 dBm input power is inputted to the frequency multiplier 216a, a differential signal of 26.4 GHz frequency and −16 dBm output power is outputted from the frequency multiplier 216a. In this case, a differential signal of 8.8 GHz frequency and −40 dBm output power is also outputted. Thus, a suppression ratio of −40 dBc is obtained for the 8.8 GHz frequency from the differential signal inputted at 8.8 GHz frequency and the differential signal outputted at 8.8 GHz frequency. A suppression ratio of −24 dBc is obtained for the 26.4 GHz frequency from the differential signal inputted at 8.8 GHz frequency and the differential signal outputted at 26.4 GHz frequency.

Furthermore, the counter-flow of the signal of 26.4 GHz frequency, from the output side to the input side of the frequency multiplier 216a, is suppressed. For this reason, it is possible to suppress the leakage caused by the 26.4 GHz signal between the balanced modulator 203 and the quadrature demodulator 112a.

FIG. 15 is a diagram showing voltage waveforms of the differential signal outputted from the frequency multiplier 216a of the present embodiment. As shown in FIG. 15, the frequency multiplier 216a outputs a differential signal including a frequency component of 26.4 GHz frequency and made up of a positive-side signal and a negative-side signal having a phase difference of 180 degrees from the positive-side signal.

Figure 16:
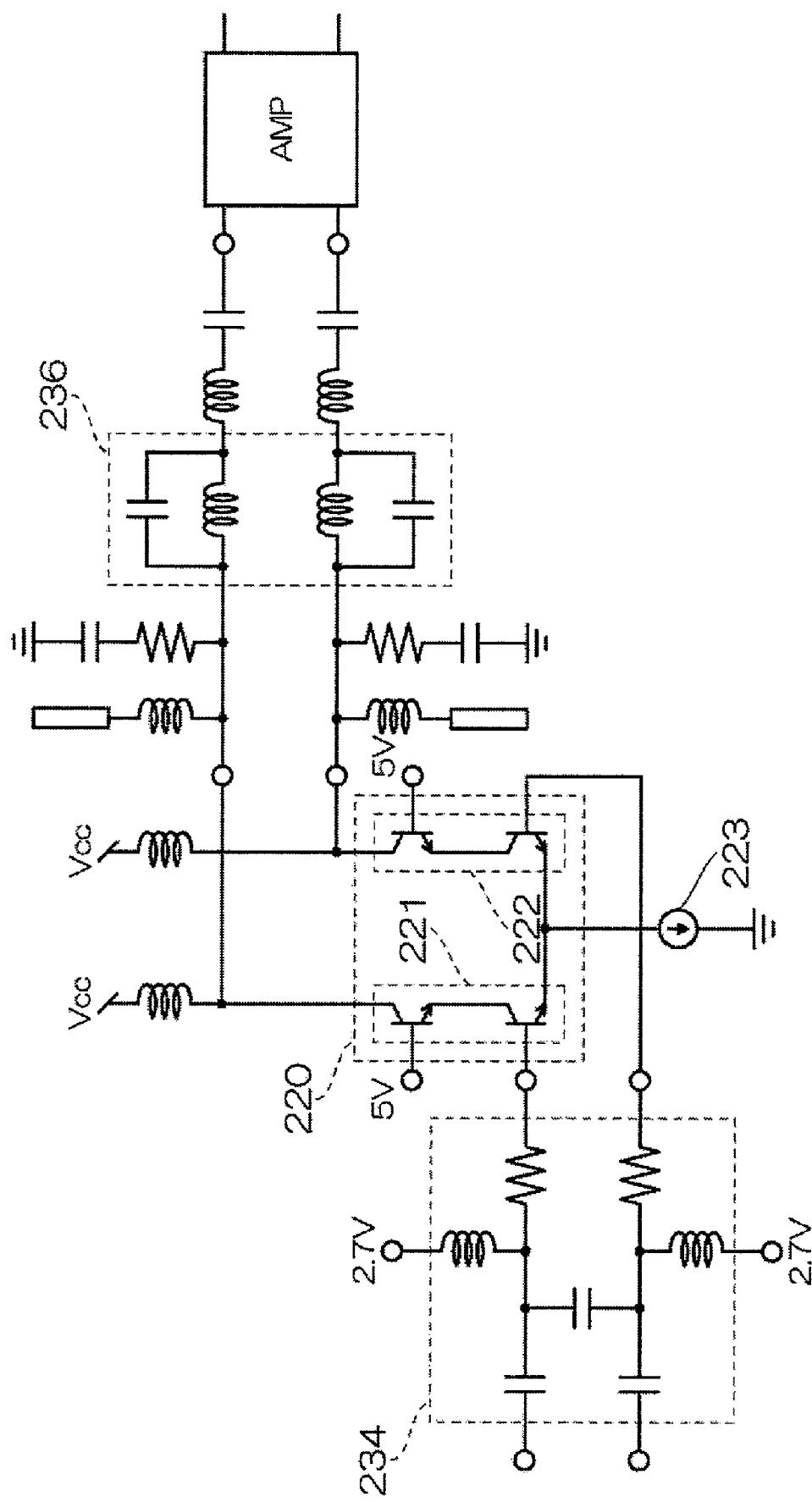
FIG. 16 is a diagram showing the configuration in the case where the frequency multiplier of the second embodiment according to the present invention is made up of a doubler.
Figure 17:
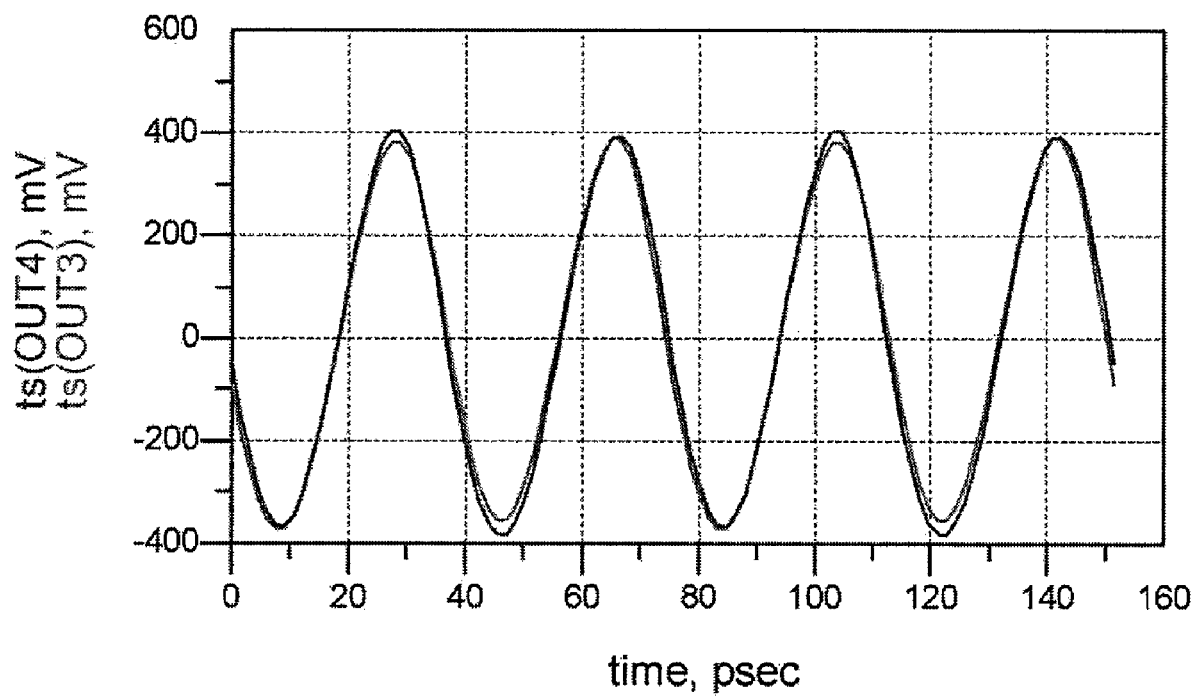
FIG. 17 is a diagram showing the voltage waveforms in the case where the frequency multiplier of the second embodiment according to the present invention is made up of a doubler.

Note that, in the case of configuring the frequency multiplier 216a by using the cascode-connected differential amplifier 220, it is preferable to configure it with an odd-order multiplier of three times or more. This is because, as shown FIG. 16, assuming that the frequency multiplier 216a is configured of a doubler using the cascode-connected differential amplifier 220, in this case, an output signal of the second harmonic wave becomes in-phase, as shown FIG. 17, and no differential signal can be obtained.

Figure 18:
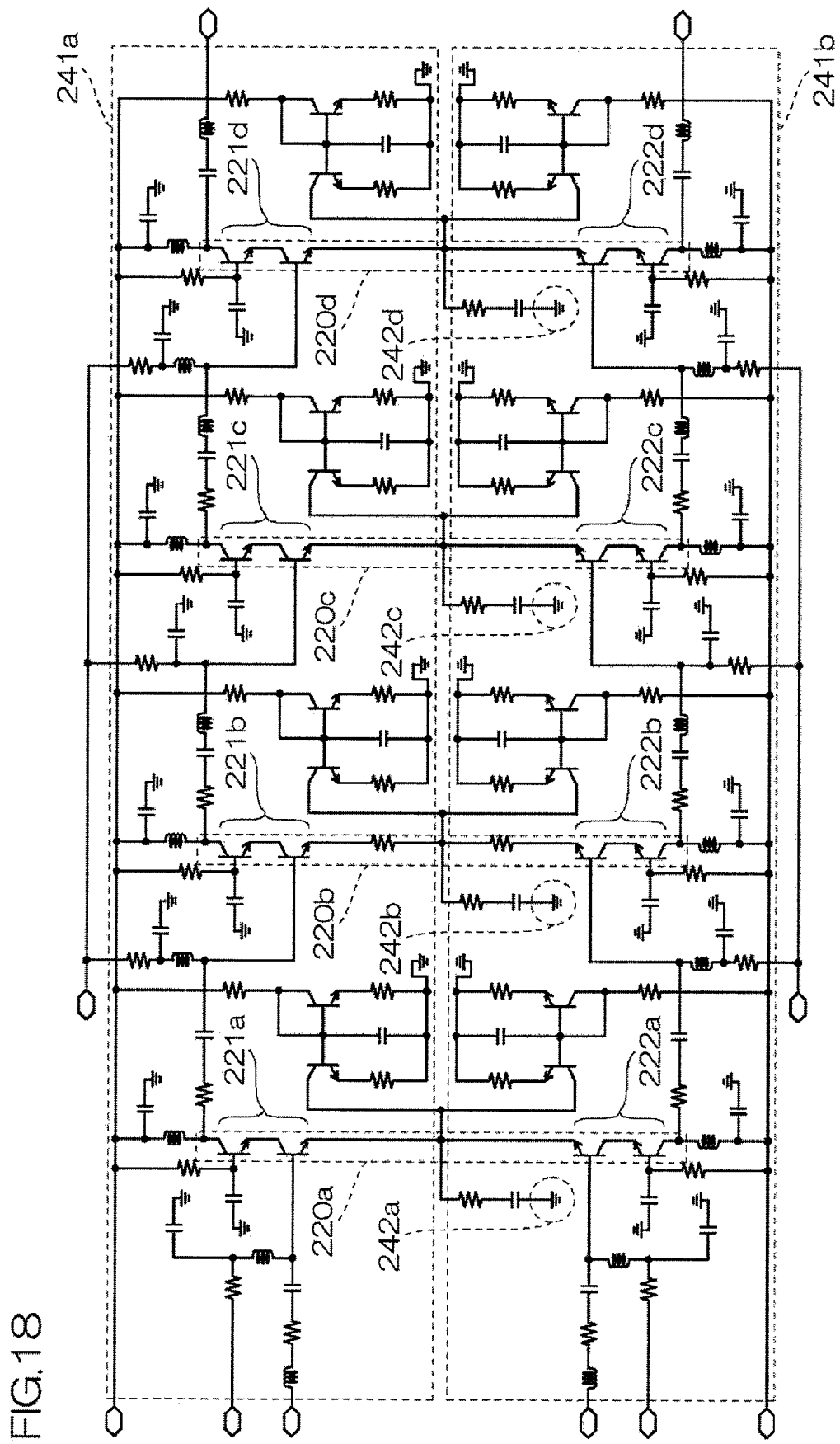
FIG. 18 is a diagram showing a concrete circuit configuration of the frequency multiplier of the second embodiment according to the present invention.

FIG. 18 is a diagram showing a concrete configuration of the frequency multiplier of the present embodiment. As shown in FIG. 18, a differential transmission unit (phase 0 degree) 241a for transmitting a positive signal of the differential signal and a differential transmission unit (phase 180 degrees) 241b for transmitting a negative signal of the differential signal are formed on a GaAs substrate. Furthermore, differential amplifiers made up of a pair of cascode-connected amplifiers are formed in a four-stage configuration. Here, differential amplifiers 220a, 220b, 220c and 220d are formed. The differential amplifier 220a is made up of cascode-connected amplifiers 221a and 222a. The differential amplifier 220b is made up of cascode-connected amplifiers 221b and 222b. The differential amplifier 220c is made up of cascode-connected amplifiers 221c and 222c. The differential amplifier 220d is made up of cascode-connected amplifiers 221d and 222d.

Figure 19:
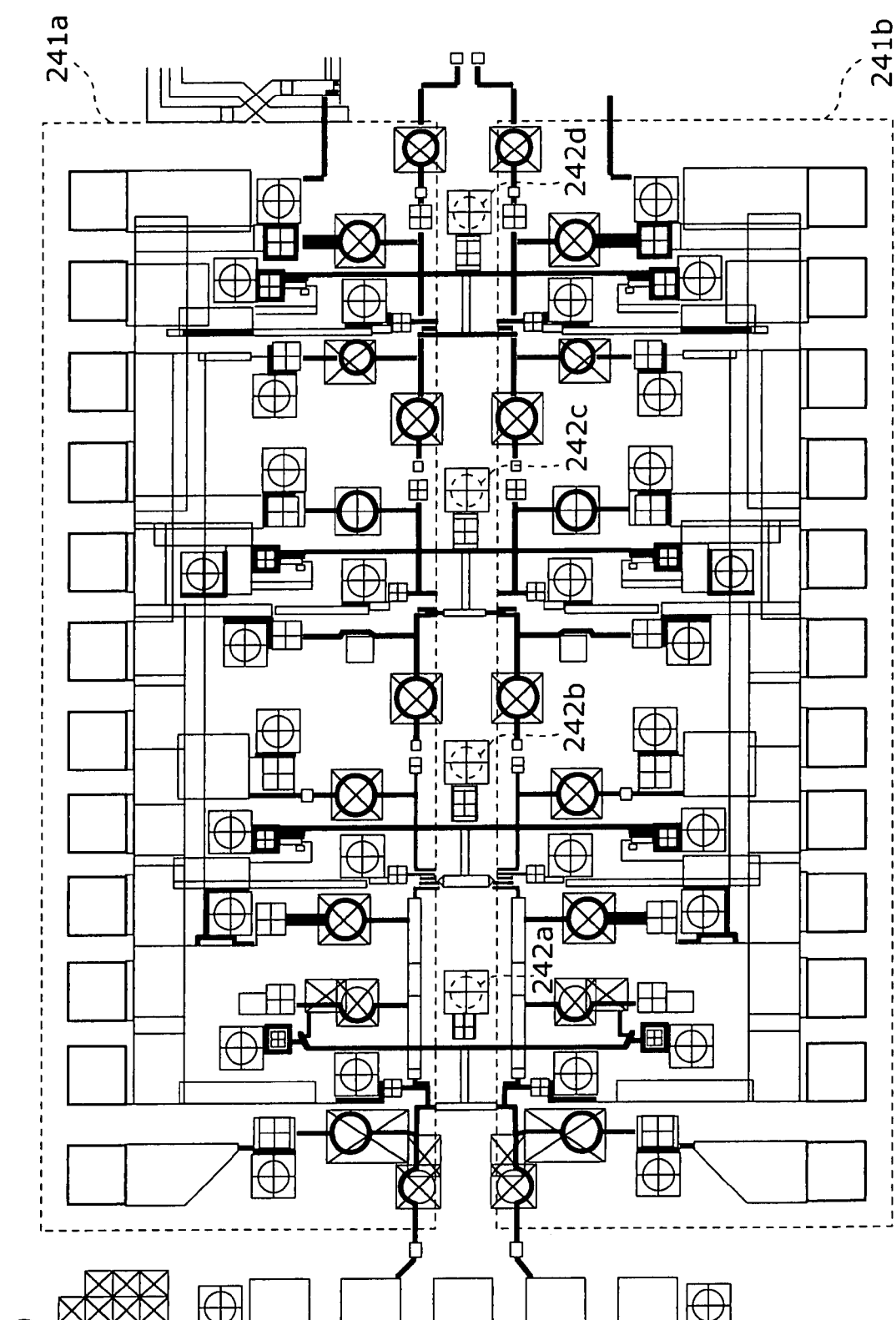
FIG. 19 is a diagram showing the concrete circuit configuration of the frequency multiplier of the second embodiment according to the present invention.

Furthermore, as shown in FIG. 19, via holes 242a, 242b, 242c and 242d are formed in a central part between the differential transmission unit (phase 0 degree) 241a and the differential transmission unit (phase 180 degrees) 241b.

Figure 20:
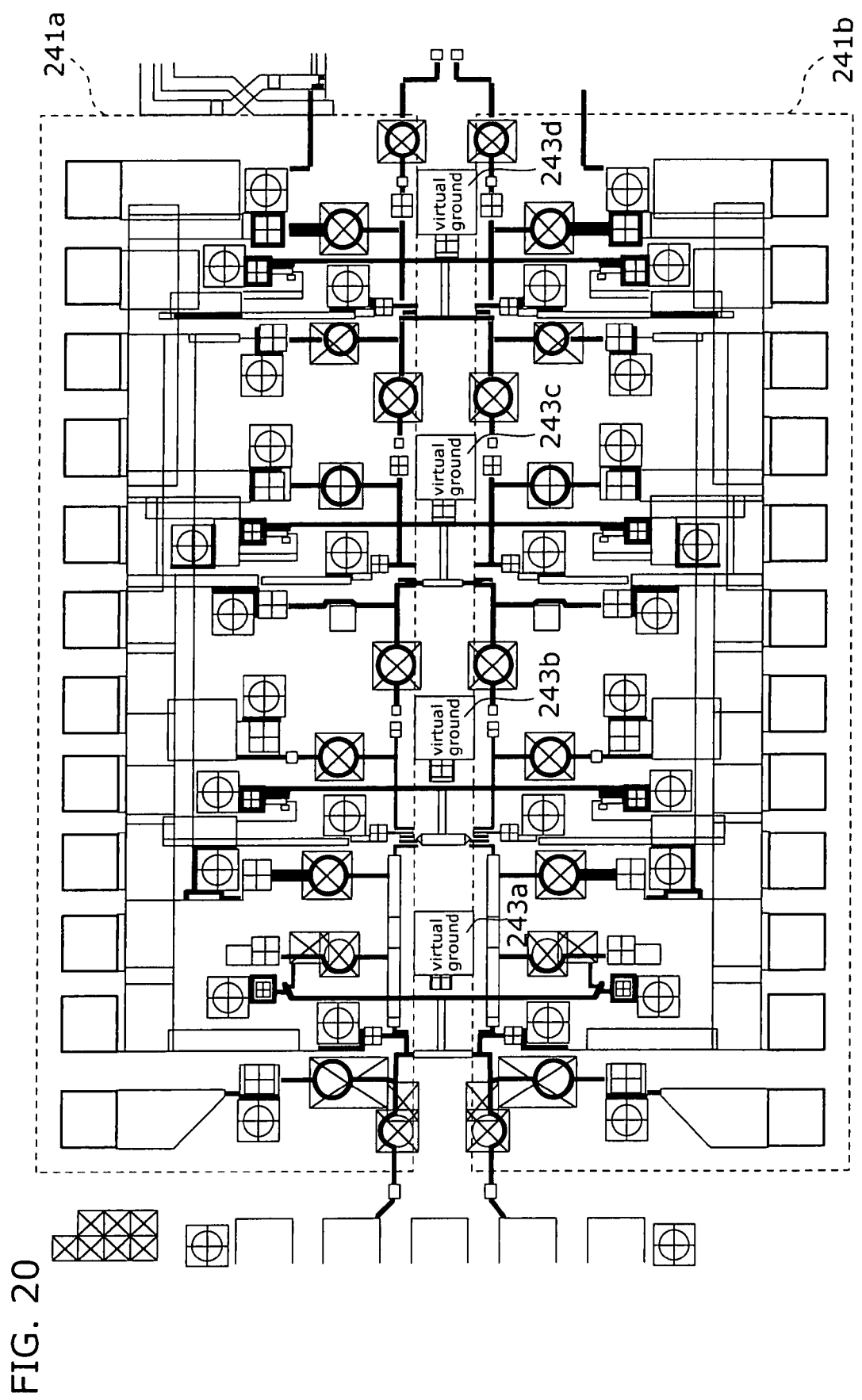
FIG. 20 is a diagram showing a first comparative example of the frequency multiplier of the second embodiment according to the present invention.

Here, as shown in FIG. 20, virtual grounds 243a, 243b, 243c and 243d as reference grounds of a transmission system of the differential signal are formed in the central part between the differential transmission unit (phase 0 degree) 241a and the differential transmission unit (phase 180 degrees) 241b. In this case, when the frequency of the differential signal becomes 20 GHz or higher, a difference arises in a reference grounding impedance of each individual stage as to transmission of the signal in the multiplier, which results in variations in the grounding state. For this reason, there is a problem that gain characteristics of the multiplier deteriorate.

Figure 21:
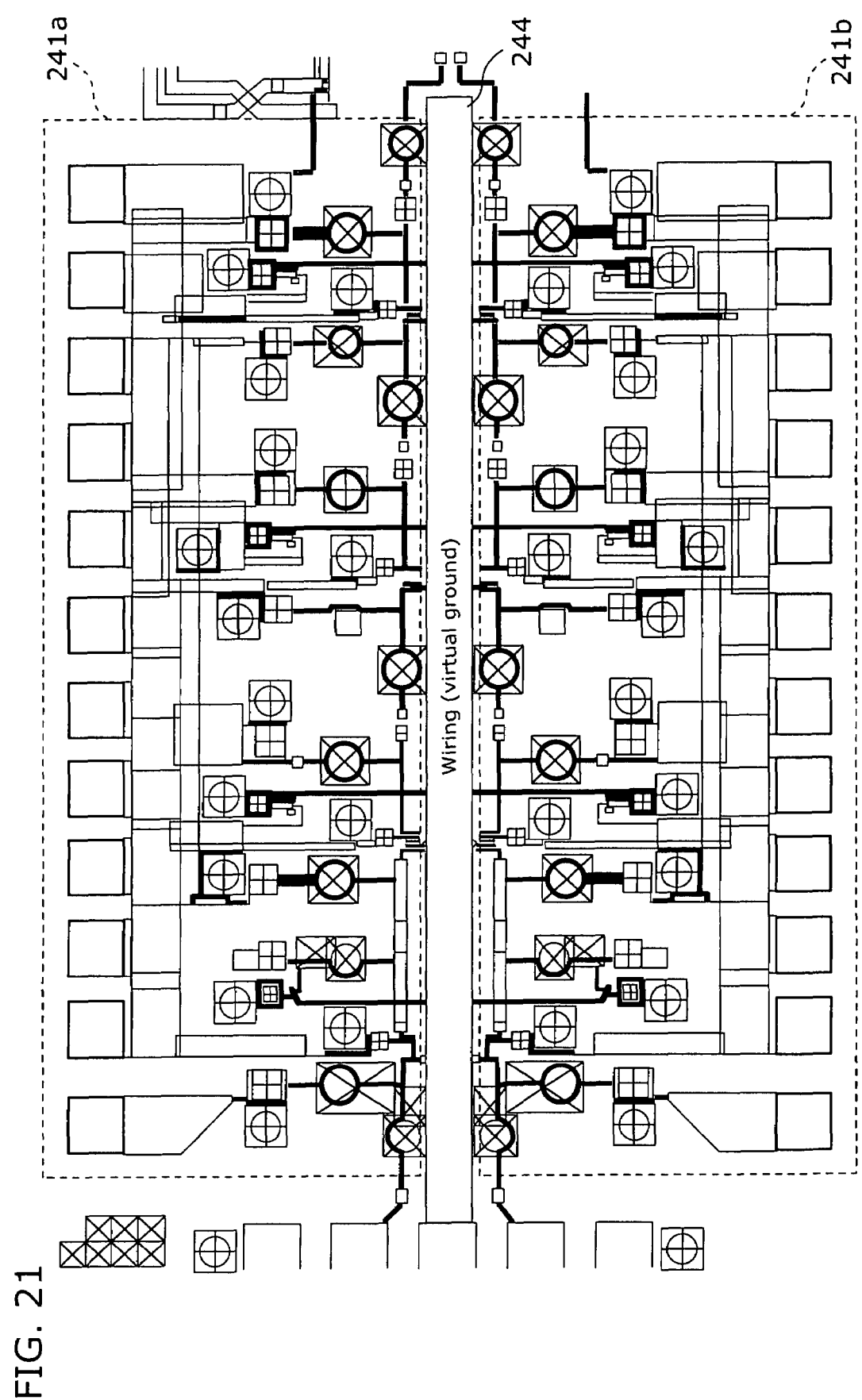
FIG. 21 is a diagram showing a second comparative example of the frequency multiplier of the second embodiment according to the present invention.

As shown in FIG. 21, an electrically connected wiring (virtual ground) 244 is formed as the reference ground of the transmission system of the differential signal in a transmission direction of the differential signal in the central part between the differential transmission unit (phase 0 degree) 241a and the differential transmission unit (phase 180 degrees) 241b. In this case, when the frequency of the differential signal becomes 20 GHz or higher, the wiring (virtual ground) 244 functions as an inductance so that a difference arises in a reference grounding impedance of each individual stage as to transmission of the signal in the multiplier, which results in variations in the grounding state. For this reason, there is a problem that the gain characteristics of the multiplier deteriorate. There is also a problem that, as the wiring for grounding is formed on a circuit forming surface, a feedback current flows in conjunction with the transmission of the differential signal, resulting in an increase in radiated noise which affects the performance of the radar apparatus.

In comparison, according to the present embodiment, the virtual ground of the cascode-connected amplifier 221a and the virtual ground of the cascode-connected amplifier 222a are electrically connected via the via hole 242a with the ground layer formed on the backside of the GaAs substrate. The virtual ground of the cascode-connected amplifier 221b and the virtual ground of the cascode-connected amplifier 222b are electrically connected via the via hole 242b with the ground layer formed on the backside of the GaAs substrate. The virtual ground of the cascode-connected amplifier 221c and the virtual ground of the cascode-connected amplifier 222c are electrically connected via the via hole 242c with the ground layer formed on the backside of the GaAs substrate in a state where parasitic components such as an inductance is low. The virtual ground of the cascode-connected amplifier 221d and the virtual ground of the cascode-connected amplifier 222d are electrically connected via the via hole 242d with the ground layer formed on the backside of the GaAs substrate.

Figure 22:
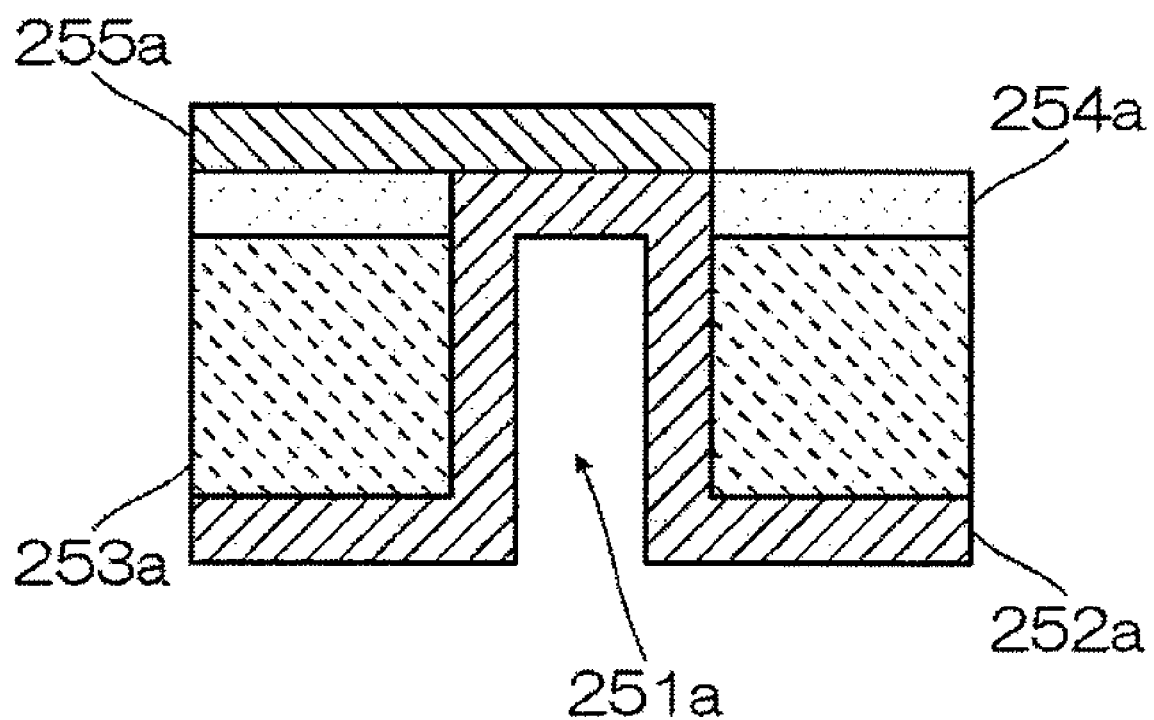
FIG. 22 is a diagram showing a cross section of a via hole portion of the frequency multiplier of the second embodiment according to the present invention.

To be more precise, as shown in FIG. 22, a via hole 251a is formed by performing etching from the backside of a GaAs substrate 253a to pass through the GaAs substrate 253a and an insulating layer 254a formed on a front face of the GaAs substrate 253a. Furthermore, a ground layer 252a is formed from the backside of the GaAs substrate 253a through the inside of the via hole 251a until a circuit element connection wiring 255a.

Here, the via hole 251a is formed with a 70-µm diameter as an example. The ground layer 252a is formed with thickness of 5 µm by gold electroplating or the like. The GaAs substrate 253a is formed with thickness of 100 µm. The insulating layer 254a is formed with thickness of 0.2 µm by silicon nitride, silicon oxide or the like. The circuit element connection wiring 255a is formed with thickness of 3 µm by gold electroplating.

Figure 23:
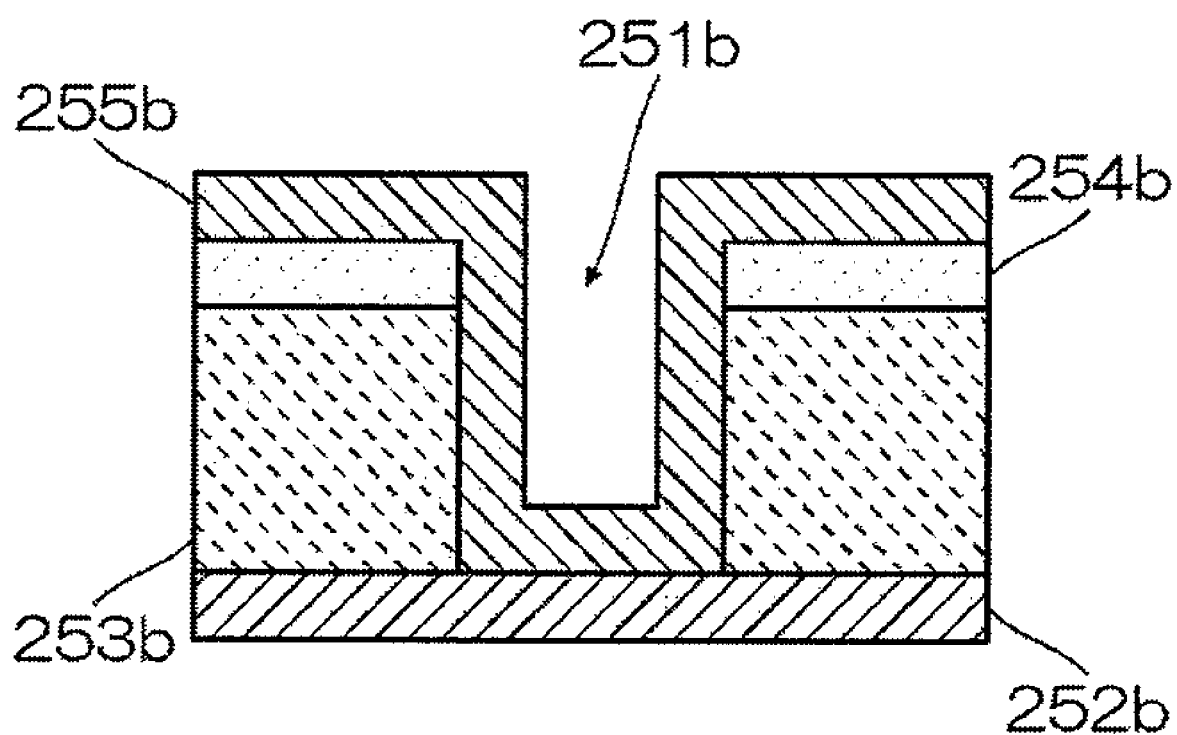
FIG. 23 is a diagram showing the cross section of the via hole part of the frequency multiplier as a first variation of the second embodiment according to the present invention.

Note that, as shown in FIG. 23, a via hole 251b may be formed by performing etching from the surface of an insulating layer 254b, passing through the insulating layer 254b and GaAs substrate 253b and then to a ground layer 252b formed on the backside of the GaAs substrate 253b. Furthermore, a circuit element connection wiring 255b may be formed from the surface of the insulating layer 254b, through inside of the via hole 251b, until the ground layer 252b.

In this case, the via hole 251b is formed with a 70 µm diameter as an example. The ground layer 252b is formed with thickness of 5 µm by gold electroplating or the like. The GaAs substrate 253b is formed with thickness of 100 µm. The insulating layer 254b is formed with thickness of 0.2 µm by silicon nitride, silicon nitride or the like. The circuit element connection wiring 255b is formed with thickness of 3 µm by gold electroplating.

Figure 24:
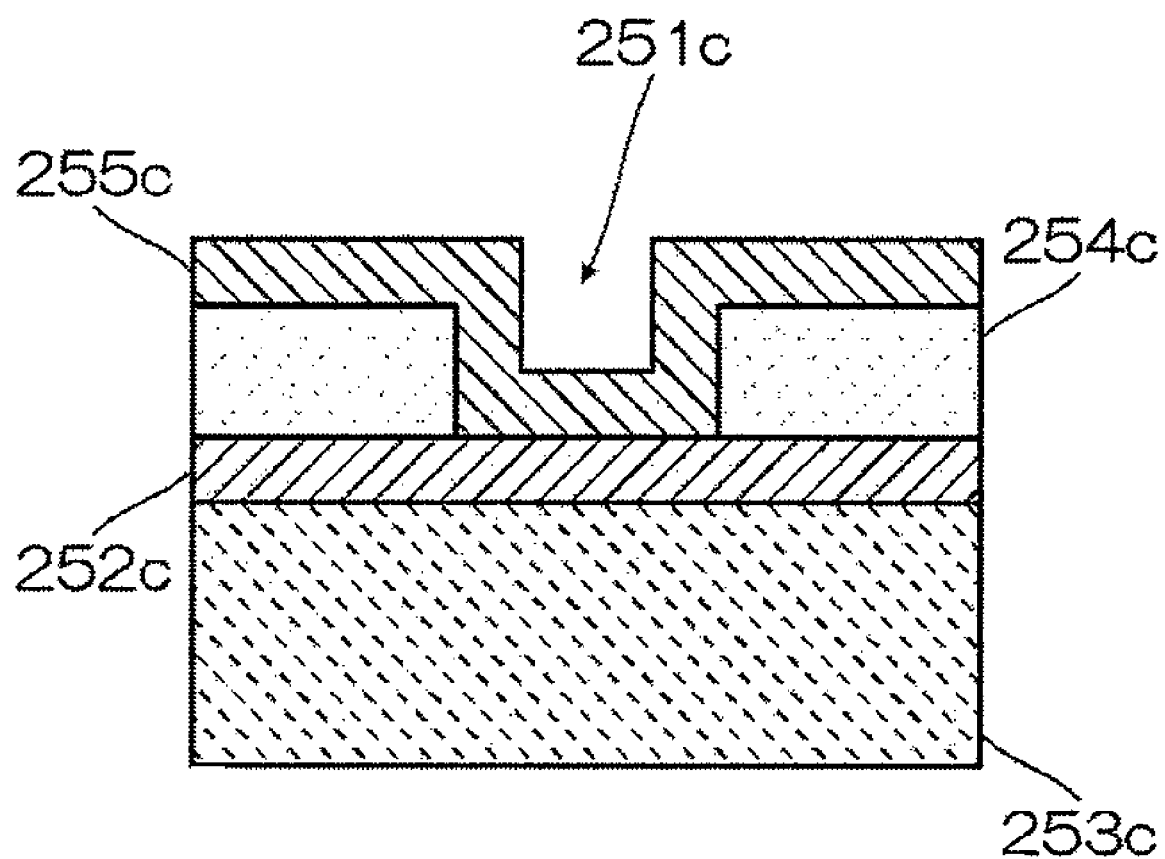
FIG. 24 is a diagram showing the cross section of the via hole portion of the frequency multiplier as a second variation of the second embodiment according to the present invention.

Note that, as shown in FIG. 24, a via hole 251c is formed by performing etching from the surface of an insulating layer 254c, passing through the insulating layer 254c and then up to a ground layer 252c formed on the front face of a GaAs substrate 253c. Furthermore, a circuit element connection wiring 255c may be formed from the surface of the insulating layer 254c, through inside of the via hole 251c, until the ground layer 252c.

In this case, the via hole 251c is formed with a 70 µm diameter as an example. The ground layer 252c is formed with thickness of 1.5 µm by evaporated metal of titanium/gold (Ti/Au) or the like. The GaAs substrate 253c is formed with thickness of 100 µm. The insulating layer 254c is formed with thickness of 0.2 µm by silicon nitride, silicon oxide or the like. The circuit element connection wiring 255c is formed with thickness of 3 µm by gold electroplating.

Figure 25:
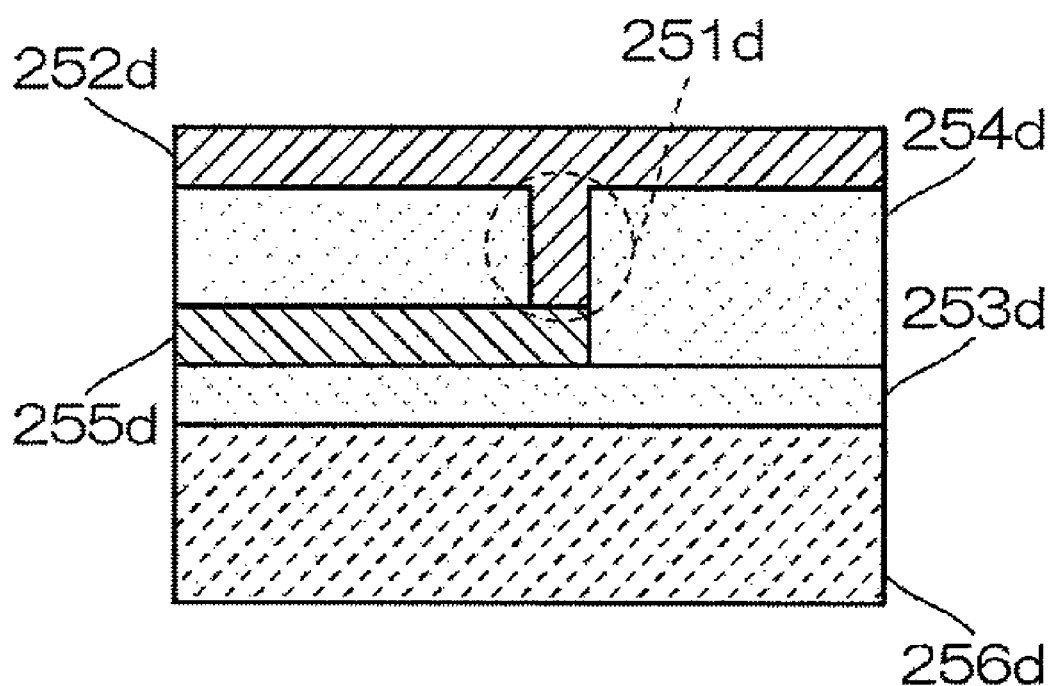
FIG. 25 is a diagram showing the cross section of the via hole portion of the frequency multiplier as a third variation of the second embodiment according to the present invention.

Note that, as shown in FIG. 25, conductive Si substrate 256d or the like is used. A via hole 251d is formed by performing etching on an insulating layer 254d formed on the surface of a circuit element connection wiring 255d or the insulating layer 253d until the circuit element connection wiring 255d. Furthermore, the ground layer 252d may be formed from the surface of the insulating layer 254d, through inside of the via hole 251d, until the circuit element connection wiring 255d.

In this case, the via hole 251d is formed with a 20 µm diameter as an example. The ground layer 252d is formed with thickness of 1.5 µm by evaporated metal of titanium/gold (Ti/Au) or the like. The insulating layer 253d is formed with thickness of 0.2 µm by silicon nitride, oxide silicon or the like. The insulating layer 254d is formed with thickness of 8 µm by BCB (Benzocyclobutene) or the like. The circuit element connection wiring 255d is formed with thickness of 3 µm by gold electroplating. The Si substrate 256d is formed with thickness of 100 µm.

Note that, in mounting, onto an assembly board, an MMIC chip having a frequency multiplier formed in such manner, it is possible to perform mounting so that the ground layer 252d becomes the assembly board-side. In other words, it is possible to perform mounting so that the ground layer becomes the bottom layer of the circuit element connection wiring 255d. Accordingly, when a high-frequency signal is transmitted to the circuit element connection wiring 255d, it is possible to avoid high-frequency loss due to a conductive or resistive Si substrate.

Even in any of these cases, by transmitting the high-frequency signal in the multiplier, it is possible to suppress the generation of a difference caused by the reference grounding impedance of the differential amplifier of each individual stage. Furthermore, as a good grounding state can be realized, it is possible to suppress the deterioration of the gain characteristics of the multiplier.

Note that, for example, improvement of 7 to 8 dB or so is possible in comparison with the multipliers shown in FIGS. 20 and 21. As the wiring for grounding is formed in a layer different from the circuit forming surface, it is possible to suppress the radiated noise generated by the feedback current accompanying the transmission of the differential signal.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be utilized as a radar apparatus or the like used at high frequencies such as a microwave band and a millimeter waveband, and in particular, as a radar apparatus or the like which requires higher performance and lower power consumption.

What is claimed is:

1. A radar apparatus which transmits a spectrum-spread radar wave, receives a reflected wave obtained through reflection of the radar wave off an object, and detects the object from the reflected wave, said radar apparatus comprising:
    a pseudo-noise code generator which generates a pseudo-noise code;
    a delay device which delays the pseudo-noise code generated by said pseudo-noise code generator;
    an oscillator which generates a high-frequency signal;
    a transmission multiplier, made up of a differential circuit for inputting and outputting a differential signal, to which a high-frequency signal divided for transmission from the high-frequency signal generated by said oscillator is inputted as a transmission differential signal which is the differential signal, and which multiplies a frequency of the transmission differential signal by a predetermined multiplication ratio, the differential signal being made up of a positive-side signal and a negative-side signal;
    a reception multiplier, made up of the differential circuit, to which a high-frequency signal divided for reception from the high-frequency signal generated by said oscillator is inputted as a reception differential signal which is the differential signal, and which multiplies a frequency of the reception differential signal by the same multiplication ratio as with said transmission multiplier;
    a transmitter which generates the radar wave by using the differential signal obtained through the multiplication by said transmission multiplier and the pseudo-noise code generated by said pseudo-noise code generator; and
    a receiver which generates, from the reflected wave, a first demodulated signal and a second demodulated signal by using the differential signal obtained through the multiplication by said reception multiplier and the pseudo-noise code delayed by said delay device, the second demodulated signal having a phase that is orthogonal to the first demodulated signal.

2. The radar apparatus according to claim 1,
wherein said transmitter includes a first mixer which mixes the differential signal obtained through the multiplication by said transmission multiplier and the pseudo-noise code generated by said pseudo-noise code generator, so as to generate a signal to be transmitted as the radar wave,
said receiver includes:
an offset clock which generates an intermediate-frequency clock signal;
an exclusive-OR calculating unit which calculates an exclusive-OR between the pseudo-noise code delayed by said delay device and the intermediate-frequency clock signal generated by said offset clock;
a second mixer which mixes the signal obtained through the calculation of the exclusive-OR by said exclusive-OR calculating unit and the reflected wave, so as to inversely spread the reflected wave of which spectrum is spread;
a third mixer which mixes the signal obtained through the mixing by said second mixer and the differential signal obtained through the multiplication by said reception multiplier, so as to generate the first demodulated signal of an intermediate frequency;
a phase shifter which shifts, by 90 degrees, a phase of the differential signal obtained through the multiplication by said reception multiplier; and
a fourth mixer which mixes the signal obtained through the mixing by said second mixer and the differential signal obtained through the phase shifting by said phase shifter, so as to generate the second demodulated signal of an intermediate frequency.

3. The radar apparatus according to claim 1,
wherein said transmitter includes:
an intermediate-frequency oscillator which generates an intermediate-frequency signal;
a first mixer which mixes the intermediate-frequency signal generated by said intermediate-frequency oscillator and the differential signal obtained through the multiplication by said transmission multiplier; and
a second mixer which mixes the signal obtained through the mixing by said first mixer and the pseudo-noise code generated by said pseudo-noise code generator, so as to generate a signal to be transmitted as the radar wave, and
said receiver includes:
a third mixer which mixes the pseudo-noise code delayed by said delay device and the reflected wave, so as to inversely spread the reflected wave of which spectrum is spread;
a fourth mixer which mixes the signal obtained through the mixing by said third mixer and the differential signal obtained through the multiplication by said reception multiplier, so as to generate the first demodulated signal of an intermediate frequency;
a phase shifter which shifts, by 90 degrees, a phase of the differential signal obtained through the multiplication by said reception multiplier; and
a fifth mixer which mixes the signal obtained through the mixing by said third mixer and the differential signal obtained through the phase shifting by the phase shifter, so as to generate the second demodulated signal of an intermediate frequency.

4. The radar apparatus according to claim 1,
wherein said transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and
a virtual ground of said first amplifier circuit and a virtual ground of said second amplifier circuit are electrically connected, via a via hole, with a ground layer formed on a backside of a semiconductor substrate on which said differential amplifier circuit is formed.

5. The radar apparatus according to claim 1,
wherein said transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and
a virtual ground of the first amplifier circuit and a virtual ground of the second amplifier circuit are electrically connected, via a via hole, with a ground layer formed in a layer portion lower than a portion in which said differential amplifier circuit is formed, in a semiconductor substrate on which said differential amplifier circuit is formed.

6. The radar apparatus according to claim 1, wherein said transmission multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and a virtual ground of said first amplifier circuit and a virtual ground of said second amplifier circuit are electrically connected, via a via hole, with a ground layer formed in a layer portion higher than a portion in which said differential amplifier circuit is formed, in a semiconductor substrate on which said differential amplifier circuit is formed.

7. The radar apparatus according to claim 1, wherein said transmission multiplier includes:

an input buffer circuit which generates, from the transmission differential signal, a first differential signal and a second differential signal having a phase difference of 90 degrees from the first differential signal;

a Gilbert cell mixer which mixes the first differential signal and the second differential signal generated by said input buffer circuit; and an output buffer circuit which amplifies a third differential signal obtained through the mixing by said Gilbert cell mixer.

8. The radar apparatus according to claim 7, wherein said input buffer circuit is made up of one or more transistors, and generates the first differential signal and the second differential signal, said Gilbert cell mixer is made up of one or more transistors, and generates the third differential signal from the first differential signal and the second differential signal, and said transmission multiplier includes:

a first bias terminal to which a signal for adjusting a bias of one or more transistors is inputted, the one or more transistors making up said input buffer circuit and being inputted with the positive-side signal of the transmission differential signal; and a second bias terminal to which a signal for adjusting a bias of one or more transistors is inputted, the one or more transistors making up said input buffer circuit and being inputted with the negative-side signal of the transmission differential signal.

9. The radar apparatus according to claim 7, wherein said input buffer circuit is made up of a polyphase filter, and generates the first differential signal and the second differential signal, said Gilbert cell mixer is made up of one or more transistors, and generates a third differential signal from the first differential signal and the second differential signal, and said transmission multiplier includes:

a first bias terminal to which a signal for adjusting a bias of one or more transistors is inputted, the one or more transistors making up said Gilbert cell mixer and being inputted with the positive-side signal of the first differential signal;

a second bias terminal to which a signal for adjusting a bias of one or more transistors is inputted, the one or more transistors making up said Gilbert cell mixer and being inputted with the negative-side signal of the first differential signal;

a third bias terminal to which a signal for adjusting a bias of one or more transistors is inputted, the one or more transistors making up said Gilbert cell mixer and being inputted with the positive-side signal of the second differential signal; and a fourth bias terminal to which a signal for adjusting a bias of one or more transistors is inputted, the one or more transistors making up said Gilbert cell mixer and being inputted with the negative-side signal of the second differential signal.

10. The radar apparatus according to claim 1, wherein the high-frequency signal generated by said oscillator is a single-ended signal, and said radar apparatus comprises a conversion circuit which converts the single-ended signal generated by said oscillator into the differential signal, and outputs the differential signal to said transmission multiplier and said reception multiplier.

11. The radar apparatus according to claim 1, comprising a transmission amplifier which amplifies the differential signal obtained through the multiplication by said transmission multiplier, and outputs the amplified differential signal to said transmitter.

12. The radar apparatus according to claim 1, wherein said reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and a virtual ground of the first amplifier circuit and a virtual ground of the second amplifier circuit are electrically connected, via a via hole, with a ground layer formed on a backside of a semiconductor substrate on which said differential amplifier circuit is formed.

13. The radar apparatus according to claim 1, wherein said reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and a virtual ground of the first amplifier circuit and a virtual ground of the second amplifier circuit are electrically connected, via a via hole, with a ground layer formed in a layer portion lower than a portion in which said differential amplifier circuit is formed, in a semiconductor substrate on which said differential amplifier circuit is formed.

14. The radar apparatus according to claim 1, wherein said reception multiplier includes a differential amplifier circuit having a set of a first amplifier circuit and a second amplifier circuit, the first amplifier circuit being made up of a first transistor and a second transistor which are cascode-connected, and the second amplifier circuit being made up of a third transistor and a fourth transistor which are cascode-connected, and a virtual ground of said first amplifier circuit and a virtual ground of said second amplifier circuit are electrically connected, via a via hole, with a ground layer formed in a layer portion higher than a portion in which said differential amplifier circuit is formed, in a semiconductor substrate on which said differential amplifier circuit is formed.

15. The radar apparatus according to claim 1, wherein said reception multiplier includes:

an input buffer circuit which generates, from the reception differential signal, a first differential signal and a second differential signal having a phase difference of 90 degrees from the first differential signal;

a Gilbert cell mixer which mixes the first differential signal and the second differential signal generated by said input buffer circuit; and an output buffer circuit which amplifies a third differential signal obtained through the mixing by said Gilbert cell mixer.

16. The radar apparatus according to claim 15, wherein said input buffer circuit is made up of one or more transistors, and generates the first differential signal and the second differential signal, said Gilbert cell mixer is made up of one or more transistors, and generates the third differential signal from the first differential signal and the second differential signal, and said reception multiplier includes:

a first bias terminal to which a signal for adjusting a bias of one or more transistors is inputted, the one or more transistors making up said input buffer circuit and being inputted with the positive-side signal of the reception differential signal; and a second bias terminal to which a signal for adjusting a bias of one or more transistors is inputted, the one or more transistors making up said input buffer circuit and being inputted with the negative-side signal of the reception differential signal.

17. The radar apparatus according to claim 15, wherein said input buffer circuit is made up of a polyphase filter, and generates the first differential signal and the second differential signal, said Gilbert cell mixer is made up of one or more transistors, and generates the third differential signal from the first differential signal and the second differential signal, and said reception multiplier includes:

a first bias terminal to which a signal for adjusting a bias of one or more transistors is inputted, the one or more transistors making up said Gilbert cell mixer and being inputted with the positive-side signal of the first differential signal;

a second bias terminal to which a signal for adjusting a bias of one or more transistors is inputted, the one or more transistors making up said Gilbert cell mixer and being inputted with the negative-side signal of the first differential signal;

a third bias terminal to which a signal for adjusting a bias of one or more transistors is inputted, the one or more transistors making up said Gilbert cell mixer and being inputted with the positive-side signal of the second differential signal; and a fourth bias terminal to which a signal for adjusting a bias of one or more transistors is inputted, the one or more transistors making up said Gilbert cell mixer and being inputted with the negative-side signal of the second differential signal.

18. The radar apparatus according to claim 1, comprising a reception amplifier which amplifies the differential signal obtained through the multiplication by said reception multiplier, and outputs the amplified differential signal to said receiver.

* * * * *